(12) United States Patent
Cox

(10) Patent No.: US 12,315,672 B2
(45) Date of Patent: May 27, 2025

(54) MULTIPLE INTERFACE ELECTRONIC CARD

(71) Applicant: X-Card Holdings, LLC, West Chester, PA (US)

(72) Inventor: Mark A. Cox, West Chester, PA (US)

(73) Assignee: X-CARD HOLDINGS, LLC, West Chester, PA (US)

( * ) Notice: Subject to any disclaimer, the term of this patent is extended or adjusted under 35 U.S.C. 154(b) by 0 days.

(21) Appl. No.: 18/482,246

(22) Filed: Oct. 6, 2023

(65) Prior Publication Data

US 2024/0038444 A1 Feb. 1, 2024

Related U.S. Application Data

(63) Continuation of application No. 17/358,330, filed on Jun. 25, 2021, now Pat. No. 11,783,997, which is a continuation of application No. 16/099,570, filed as application No. PCT/US2017/033308 on May 18, 2017, now Pat. No. 11,062,842.

(60) Provisional application No. 62/340,224, filed on May 23, 2016.

(51) Int. Cl.
*H01F 38/14* (2006.01)
*G06K 19/07* (2006.01)
*G06K 19/077* (2006.01)
*H01F 27/28* (2006.01)

(52) U.S. Cl.
CPC ......... *H01F 38/14* (2013.01); *G06K 19/0712* (2013.01); *G06K 19/072* (2013.01); *G06K 19/0721* (2013.01); *G06K 19/0723* (2013.01); *G06K 19/0724* (2013.01); *G06K 19/07701* (2013.01); *G06K 19/07705* (2013.01); *G06K 19/07711* (2013.01); *G06K 19/07767* (2013.01); *H01F 27/2804* (2013.01); *H01F 2038/143* (2013.01)

(58) Field of Classification Search
CPC ................. H01F 38/14; H01F 27/2804; H01F 2038/143; G06K 19/0712; G06K 19/072; G06K 19/0721; G06K 19/0723; G06K 19/0724; G06K 19/07711; G06K 19/07767
USPC .......................................... 307/104
See application file for complete search history.

(56) References Cited

U.S. PATENT DOCUMENTS

| | | |
|---|---|---|
| 8,576,005 B2 | 11/2013 | Liao |
| 9,548,797 B1 | 1/2017 | Green et al. |
| 9,978,009 B1 | 5/2018 | Geist et al. |
| 10,423,872 B2 | 9/2019 | Gout et al. |
| 2007/0297214 A1 | 12/2007 | Dembo |
| 2008/0311861 A1 | 12/2008 | Lepek |
| 2010/0052869 A1 | 3/2010 | Stewart |
| 2010/0265022 A1 | 10/2010 | Bhagat et al. |
| 2015/0171519 A1 | 6/2015 | Han et al. |
| 2015/0178526 A1 | 6/2015 | Roh et al. |

(Continued)

FOREIGN PATENT DOCUMENTS

| | | |
|---|---|---|
| KR | 1020130134759 A | 12/2013 |
| KR | 1020140011756 A | 1/2014 |
| KR | 1020150073737 A | 7/2015 |

*Primary Examiner* — Michael R. Fin
(74) *Attorney, Agent, or Firm* — DUANE MORRIS LLP

(57) ABSTRACT

A device includes a first inductor and a second inductor. The first inductor has a first inductive coupling profile. A first circuit component is coupled to the first inductor. A second inductor has a second inductive coupling profile. A second circuit component coupled to the second inductor.

14 Claims, 11 Drawing Sheets

(56) References Cited

U.S. PATENT DOCUMENTS

| | | |
|---|---|---|
| 2016/0013661 A1 | 1/2016 | Kurs et al. |
| 2016/0210616 A1* | 7/2016 | Lee .................... G06Q 20/3274 |
| 2016/0261026 A1 | 9/2016 | Han et al. |
| 2017/0040105 A1* | 2/2017 | Peralta .................... H01F 38/14 |
| 2017/0245317 A1 | 8/2017 | Lee et al. |
| 2018/0040950 A1* | 2/2018 | Lee .......................... H04B 5/72 |
| 2018/0322377 A1* | 11/2018 | Gout ................ G06K 19/07767 |
| 2018/0359005 A1* | 12/2018 | Ding ........................ H04B 5/72 |
| 2020/0005114 A1 | 1/2020 | Finn et al. |
| 2020/0092683 A1 | 3/2020 | Fyfe et al. |

* cited by examiner

MULTIPLE INTERFACE ELECTRONIC CARD

CROSS-REFERENCE TO RELATED APPLICATION

This application is a continuation of U.S. patent application Ser. No. 17/358,330, filed Jun. 25, 2021, which is a continuation of U.S. patent application Ser. No. 16/099,570, filed Nov. 7, 2018 (now U.S. Pat. No. 11,062,842, issued Jul. 13, 2021), which is a U.S. national stage application under 35 U.S.C. § 371 of International Application No. PCT/US2017/033308, filed May 18, 2017, which claims priority to U.S. Provisional Application No. 62/340,224, filed May 23, 2016, each of which are incorporated herein by reference in their entirety.

BACKGROUND

Short-range wireless signals provide communication between electronic devices when the electronic devices are positioned in proximity. Some short-rang wireless standards provide secure data communication for the exchange of sensitive data, such as payment information, security data, etc. For example, current short-range wireless standards, such as near-field communication (NFC), Bluetooth, WiFi, radio-frequency identification (RFID), etc. are configured to provide secured communication using interrogation and response signals.

Current short-range wireless standards are activated based on proximity of an electromagnetic signal source and an electronic device. When the electronic device receives the electromagnetic signal from the signal source, the electronic device can generate a response message including requested information (such as payment information) and transmit the response message to the signal source. Activation of the electronic device is dependent on the signal strength of the received electromagnetic signal. The strength of the electromagnetic signal can be based on the distance between the electronic device and the electromagnetic signal source.

SUMMARY

In various embodiments, a device is disclosed. The device includes a first inductor having a first inductive coupling profile, a first circuit component coupled to the first inductor, a second inductor having a second inductive coupling profile, and a second circuit component coupled to the second inductor.

In various embodiments, a device includes a first inductor configured to receive an electromagnetic signal in a first inductive coupling, a first circuit component coupled to the first inductor and configured to transition to a first mode of operation when the electromagnetic signal exceeds a first signal strength, and a second circuit component configured to transition to an on-state when the electromagnetic signal exceeds a second signal strength.

In various embodiments, an electronic card is disclosed. The electronic card includes a first inductor configured to receive an electromagnetic signal in a first inductive field, a light-emitting diode coupled to the first inductor, a second inductor configured to receive the electromagnetic signal in a second inductive field, and an integrated circuit coupled to the second inductor. The light-emitting diode is configured to operate in a first mode when the first inductor generates a first voltage and transition to a second mode when the first inductor generates a second voltage. The integrated circuit is configured to generate a predetermined electromagnetic signal when the second inductor generates a third voltage. The third voltage is greater than the first voltage.

In various embodiments, a method of providing feedback to a user of an electronic card is disclosed. The method includes receiving an electromagnetic signal by a first inductor defining a first inductive profile. A first circuit component is transitioned to a first operational mode when a signal strength of the electromagnetic signal exceeds a first power threshold. A second circuit component is transitioned to an active state when the signal strength of the electromagnetic signal exceeds a second power threshold. The first circuit component is transitioned to a second operational mode when the signal strength of the electromagnetic signal exceeds a third signal strength.

In various embodiments, a method of operating an electronic card is disclosed. The method includes receiving an electromagnetic signal by a first inductor defining a first inductive profile. A first circuit component is transitioned to a first operational mode when the electromagnetic signal has a first waveform. The first circuit component is transitioned to a second operational mode when the electromagnetic signal has a second waveform.

In various embodiments, s method of operating an electronic card is disclosed. The method includes receiving an electromagnetic signal by a first inductor defining a first inductive profile and a second inductor defining a second inductive profile. The first inductor generates a first voltage and the second inductor generates a second voltage. A first circuit component is transitioned to a first operational mode when the first voltage is equal to a first threshold. A second circuit component is transitioned to an active state when the second voltage is equal to a second threshold. The first circuit component is transitioned to a second operational mode when the first voltage is equal to a third threshold.

In various embodiments, a device includes a first inductor configured to receive an electromagnetic signal in a first inductive coupling, a first circuit component coupled to the first inductor and configured to transition to a first mode of operation when the electromagnetic signal exceeds a first signal strength, a second inductor configured to receive the electromagnetic signal in a second inductive coupling, and a third inductor configured to be selectively coupled to the second inductor.

In various embodiments, a device includes a first inductor configured to receive an electromagnetic signal in a first inductive coupling, a first circuit component configured to be selectively coupled to the first inductor, a second inductor configured to receive the electromagnetic signal in a second inductive coupling, a second circuit component configured to be selectively coupled to the second inductor, and a third inductor configured to be selectively coupled to the second inductor.

In various embodiments, a device includes a first inductor having a first inductive profile, a first circuit component coupled to the first inductor, a second inductor having a second inductive profile, a second circuit component coupled to the second inductor, a third inductor, a third circuit component inductively coupled to the third inductor, and a control circuit configured to selectively couple the first inductor and the second inductor to the third inductor.

BRIEF DESCRIPTION OF FIGURES

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
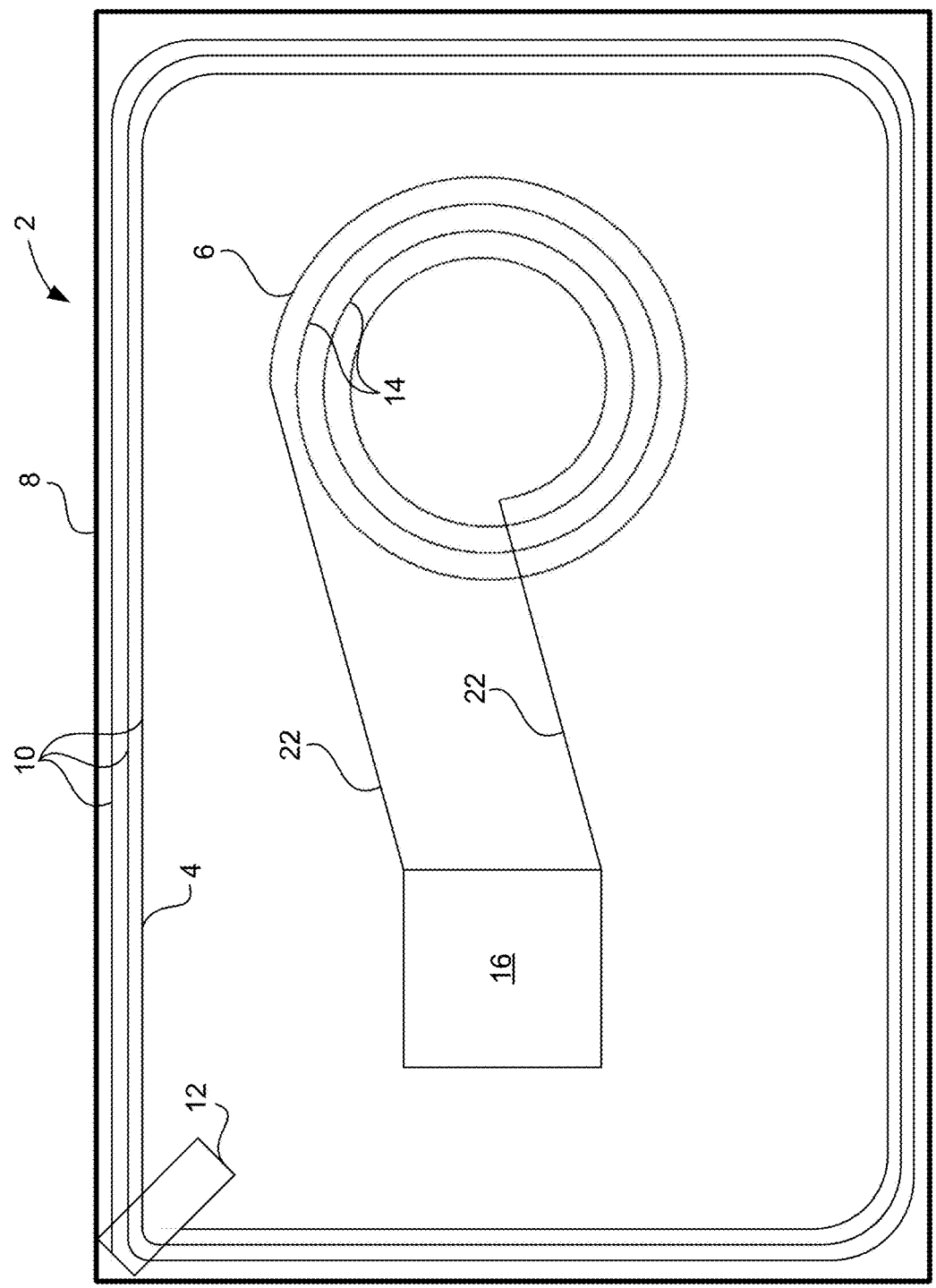
FIG. 1 illustrates an electronic card including a first circuit component coupled to a first inductor and a second circuit component coupled to a second inductor, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Moreover, "first", "second", "third", etc. may be used herein for ease of description to distinguish between different elements of a figure or a series of figures. "first", "second", "third", etc. are not intended to be descriptive of the corresponding element. Therefore, "a first wafer" described in connection with a first figure may not necessarily corresponding to a "first wafer" described in connection with another figure.

In various embodiments, an electronic card including a first inductor and a second inductor is disclosed. The first inductor is coupled to at least a first circuit component of the electronic card and the second inductor is coupled to at least a second circuit component of the electronic card. The first inductor has a first inductive profile and the second inductor has a second inductive profile. The first inductor is configured to receive an electromagnetic signal and generate a first voltage and the second inductor is configured to receive the electromagnetic signal and generate a second voltage. The first voltage and the second voltage are each related to a signal strength of the received electromagnetic signal. When the signal strength of the electromagnetic signal exceeds a first strength threshold, the first circuit component is transitioned to a first operational mode. When the signal strength exceeds a second strength threshold, the second circuit component is transitioned to an active state.

In various embodiments, an electronic card having an integrated circuit and a feedback component is disclosed. The feedback component is configured to provide an indication prior to, during, and/or after activation of the integrated circuit. The indication can be any suitable audio, visual, tactile, and/or other indication. The feedback component is configured to operate in a first mode when the electronic card is exposed to an electromagnetic signal having a first signal strength and is configured to operate in a second mode when the integrated circuit is activated. The integrated circuit can be activated when the electromagnetic signal has a second signal strength.

In various embodiments, an electronic card including a first inductor and a second inductor is disclosed. The first inductor is coupled to at least a first circuit component and a second circuit component of the electronic card. The first inductor has a first inductive profile. The first inductor is configured to receive an electromagnetic signal and generate a voltage signal. The first circuit component is transitioned to a first operational mode when the electromagnetic signal has a first waveform and is transitioned to a second operational mode when the electromagnetic signal has a second waveform. The second circuit component is transitioned to an active state when the electromagnetic signal has the first waveform and the voltage signal exceeds a predetermined threshold. The waveform of the electromagnetic signal is transitioned from the first waveform to the second waveform in response to a signal received from the second circuit component.

FIG. 1 illustrates an electronic card 2 including a first inductor 4 and a second inductor 6, in accordance with some embodiments. The electronic card 2 includes a card body 8. The card body 8 can include one or more material layers, such as one or more metal layers, plastic layers, circuit layers, intermediate layers, and/or any other suitable layers. The body 8 can have any suitable shape, such as a rectangular shape, a circular shape, a triangular shape, a regular geometric shape, a non-regular geometric shape, etc. A first inductor 4 and a second inductor 6 are disposed on the body 8. Although embodiments are discussed herein including inductors 4, 6 and inductive signal reception, it will be appreciated that the inductors can be replaced with any suitable device configured to receive an electromagnetic signal. For example, in various embodiments, the first inductor 4 and/or the second inductor 6 can be replaced by and/or include a wire antenna, a traveling wave antenna, a reflector antenna, a log-period antenna, a microstrip antenna, an aperture antenna, a fractal antenna, any suitable inductive coupling element, and/or any other suitable device configured to receive the electromagnetic signal.

In some embodiments, a first inductor 4 includes a first plurality of inductive traces 10 positioned about a first portion of the body 8 in a first loop. For example, in some embodiments, the first plurality of inductive traces 10 are positioned about a periphery of the body 8, although it will be appreciated that the first plurality of inductive traces 10 can be positioned on any suitable portion of the body 8. The first inductor 4 is electrically coupled to a first circuit component 12. The first circuit component 12 can include any suitable circuit component, such as an integrated circuit, an application-specific integrated circuit (ASIC), an application-specific standard part (ASSP), a system-on-chip (SoC), a field-programmable gate array (FPGA), a discrete circuit, one or more discrete circuit components, and/or any other suitable electronic component.

In some embodiments, the first inductor 4 is configured to receive an electromagnetic signal generate a first signal. The first signal is provided to the first circuit component 12. When one or more features of the first signal have a first predetermined value, the first circuit component 12 is transitioned from an off-state to a first operational mode. For example, in some embodiments, when the voltage of the first signal equals or exceeds a first voltage threshold, the first circuit component 12 is turned on and operates in a first operational mode. As another example, in some embodiments, if the first signal has a first predetermined waveform (for example, corresponding to a first waveform of the electromagnetic signal), the first circuit component 12 is transitioned to the first operational mode. Although embodiments are discussed herein including a voltage signal and voltage thresholds, it will be appreciated that the first circuit component 12 can be activated based on any feature of the first signal, such as a voltage, a current, a period, a waveform, and/or any other suitable feature of the electromagnetic signal.

In some embodiments, when the one or more features of the first signal have a second predetermined value, the first circuit component 12 transitions from the first operational state to a second operational state. For example, in some embodiments, when the voltage of the first signal equals or exceeds a transition voltage, the first circuit component 12 transitions from the first operational mode to the second operational mode. As another example, in some embodiments, if the first signal has a second predetermined waveform (for example, corresponding to a second waveform of the electromagnetic signal), the first circuit component 12 transitions from the first operational mode to the second operational mode. Although embodiments are discussed herein including a voltage signal and transition voltage, it will be appreciated that the first circuit component 12 can be transitioned to a second operational mode based on any feature of the first signal, such as a voltage, a current, a period, a waveform, and/or any other suitable feature.

In some embodiments, a second inductor 6 includes a second plurality of inductive traces 14 positioned about a second portion of the body 8. For example, in the illustrated embodiment, the second inductor 6 is positioned completely within the first inductor 4, although it will be appreciated that the second inductor 6 can be positioned on a portion of the body 8 spaced apart from and not contained by the first plurality of inductive traces 10. For example, in some embodiments, the first plurality of inductive traces 10 and the second plurality of inductive traces 14 can be positioned in adjacent, non-overlapping positions on the body 8. The second inductor 6 is coupled to a second circuit component 16. The second circuit component 16 can include any suitable circuit component, such as an integrated circuit, an application-specific integrated circuit (ASIC), an application-specific standard part (ASSP), a system-on-chip (SoC), a field-programmable gate array (FPGA), a discrete circuit, one or more discrete circuit components, and/or any other suitable electronic component.

The second inductor 6 is configured to generate a second signal when exposed to the electromagnetic signal. The second signal is provided to the second circuit component 16. When one or more features the second signal have a predetermined value, the second circuit component 16 is transitioned to an active state. For example, in some embodiments, when a voltage of the second signal equals or exceeds a second voltage threshold, the second circuit component 16 is transitioned to an active state and performs one or more predetermined functions. In some embodiments, the second voltage threshold is different than the first voltage threshold. For example, in some embodiments, the second voltage threshold is greater or less than the first voltage threshold. As another example, in some embodiments, if the second signal has the first predetermined waveform and the second signal equals or exceeds the second voltage threshold, the second circuit component 16 is transitioned to the active state. Although embodiments are discussed herein including a voltage signal and voltage thresholds, it will be appreciated that the second circuit component 16 can be activated based on any feature of the second signal, such as a voltage, a current, a period, a waveform, and/or any other suitable feature.

In some embodiments, the first inductor 4 has a first inductive profile and the second inductor 6 has a second inductive profile. As used herein, the term inductive profile refers to the inductive coupling (e.g., transfer of energy) between the first inductor 4, the second inductor 6, and the electromagnetic signal. For example, in various embodiments, the first inductor 4 and the second inductor 6 have different orientations, profiles, materials, windings, resonant frequencies, etc. such that the inductive coupling between the first inductor 4 and the electromagnetic signal is different than the inductive coupling between the second inductor 6. In the illustrated embodiment, the first inductor 4 has a first shape (e.g., a rectangular profile) and the second inductor 6 has a second shape (e.g., circular profile) that provides different inductive couplings between each of the inductors 4, 6 and the electromagnetic field. In other embodiments, the first and second inductors 4, 6 can have similar shapes (e.g., each are generally rectangular) but include one or more additional features that generate different inductive couplings between each of the first inductor 4, the second inductor 6 and the electromagnetic field, such as different orientations with respect to the body 8, different materials, etc.

In some embodiments, voltage of the first signal generated by the first inductor 4 and/or the voltage of the second signal generated by the second inductor 6 are related to a signal strength of the received electromagnetic signal. For example, in some embodiments, the first inductor 4 is configured to generate a first signal having a voltage equal to the first voltage threshold when the received electromagnetic signal has a first signal strength and the second inductor 6 is configured to generate a second signal having a voltage equal to the second voltage threshold when the received electromagnetic signal has a second signal strength. In some embodiments, the second signal strength is greater than the first signal strength. In some embodiments, as the strength of the electromagnetic signal increases, the voltage of each of the first signal and the second signal increases. The strength of the electromagnetic signal can increase as a distance between the electronic card 2 and an electromagnetic signal source is reduced, by applying a greater power to the electromagnetic signal source, and/or using any other suitable method or system for increasing signal strength.

In some embodiments, a gain of the first inductor 4 determines the signal strength of the electromagnetic signal at which the first signal has a voltage equal to the first voltage threshold. The gain of the first inductor 4 can be configured such that the first signal has a voltage based on a relationship between the electronic card 2 and an electromagnetic signal source. For example, in various embodiments, the electromagnetic signal has a known signal strength at various distances from a signal source. The first inductor 4 is configured to generate a first signal having a voltage equal to the first voltage threshold at a first signal strength that corresponds to a first distance from the signal source. The first distance can by any suitable distance, such as a distance of about 8", about 6", about 4", and/or any other suitable predetermined distance.

In some embodiments, a gain of the second inductor 6 determines the signal strength of the electromagnetic signal at which the second signal has a voltage equal to the second voltage threshold. The gain of the second inductor 6 can be configured such that the second signal has a voltage based on a relationship between the electronic card 2 and an electromagnetic signal source. For example, in various embodiments, the electromagnetic signal has a known signal strength at various distances from a signal source. The second inductor 6 is configured to generate a second signal having a voltage equal to the second voltage threshold at a second signal strength that corresponds to a second distance from the signal source. The second distance can by any suitable distance, such as a distance of about 4", about 3", about 2", and/or any other suitable distance.

In some embodiments, the gain of the first inductor 4 determines the signal strength of the electromagnetic signal at which the first signal has a voltage equal to the transition voltage. The gain of the first inductor 4 can be configured such that the first signal has a voltage based on a relationship between the electronic card 2 and an electromagnetic signal source. For example, in various embodiments, the electromagnetic signal has a known signal strength at various distances from a signal source. The first inductor 4 is configured to generate a first signal having a voltage equal to the transition voltage at a third signal strength that corresponds to a third distance from the signal source. The first distance can by any suitable distance, such as a distance of about 4", about 3", about 2", and/or any other suitable distance. In some embodiments, the third distance is equal to or less than the second distance.

In some embodiments, the first voltage generated by the first inductor 4 and the second voltage generated by the second inductor 6 have a predetermined relationship. For example, in some embodiments, the first inductor 4 is configured to generate a first signal having a voltage equal to the first threshold voltage at a first distance and the second inductor 6 is configured to generate a second signal having a voltage equal to the second threshold voltage at a second distance that is about half the first distance. The first distance can be any suitable distance, such as about 8", about 6", and/or about 4" and the second distance has a corresponding distance of about 4", about 3", and/or about 2", although it will be appreciated that greater and/or lesser distances can be used. It will also be appreciated that the first inductor 4 and the second inductor 6 can be configured such that the first voltage and the second voltage have any suitable ratio, such as, for example, a ratio of 1:1, 2:1, 3:1, 4:1, 5:1, 6:1, 8:1, and/or any other suitable ratio.

In some embodiments, the first circuit component 12 is transitioned to one of the first operational mode and/or the second operational mode and/or the second circuit component 16 is transitioned to an active mode when the electromagnetic signal exceeds a predetermined signal strength and has a predetermined waveform. For example, in some embodiments, the first circuit component 12 is transitioned from an off state to the first operational state when the first voltage is equal to or greater than a first threshold corresponding to a first signal strength of the electromagnetic signal and the electromagnetic signal has a first waveform. The first circuit component 12 is transitioned from the first operational state to the second operational state when the first voltage is equal to or greater than a third threshold corresponding to a third signal strength and/or when the electromagnetic signal has a second waveform.

Similarly, in some embodiments, the second circuit component 16 is transitioned from an off state to an active state when the second voltage is equal to or greater than the second voltage threshold and the electromagnetic signal has a first waveform. Although embodiments are discussed herein including voltage thresholds, waveform thresholds, and/or other parameters of an electromagnetic signal and/or generated signals (e.g., the first and second signal), it will be appreciated that any combination of the signal characteristics can be used to transition the first circuit component 12 and/or the second circuit component 16 to one or more active states.

The electromagnetic signal source can be any suitable signal source. For example, in various embodiments, the electromagnetic signal source is a near-field communication (NFC) reader, such as, an NFC enabled point-of-sale terminal, an NFC enabled mobile device, an NFC wearable device, an NFC ingestible/implantable device, and/or any other suitable NFC device. In other embodiments, the electromagnetic signal source can generate any suitable type of electromagnetic signal, such as a Bluetooth, Bluetooth Low Energy (BLE), NFC, Radio Frequency Identification (RFID), WiFi, and/or any other suitable electromagnetic signal. Although embodiments are discussed herein using one or more electromagnetic signal sources, it will be appreciated that the electromagnetic signal source can include any suitable electromagnetic source and/or combination of electromagnetic sources and is within the scope of this disclosure.

In some embodiments, prior to the electronic card 2 being exposed to an electromagnetic signal having a signal strength less than the first power, the first circuit component 12 and the second circuit component 16 are in an off-state. When the electronic card 2 is exposed to an electromagnetic signal having a signal strength equal to or greater than a first strength threshold, the first inductor 4 generates a first signal having a voltage equal to first voltage threshold. The first signal is provided to the first circuit component 12, which is turned on and operates in a first operational state when the first voltage is equal to or greater than the first voltage threshold. In some embodiments, the first operational state of the first circuit component 12 provides a first indicator corresponding to exposure of the electronic card 2 to the electromagnetic signal having a signal strength equal to or greater than the first strength threshold. The first indicator can be any suitable indicator, such as one or more of a visual, audible, tactile, and/or other sensory indicator. For example, in some embodiments, the first circuit component 12 includes a light-emitting diode (LED) configured to provide a visual indicator when the electronic card 2 is exposed to an electromagnetic signal equal to or exceeding the first strength threshold, although it will be appreciated that any suitable circuit component can provide any suitable feedback.

In some embodiments, when the electromagnetic signal exceeds a second signal strength, the second inductor 6 generates a second signal having a voltage equal to the second voltage threshold. The second voltage is provided to the second circuit component 16, which is activated at the second voltage threshold. In some embodiments, the second circuit component 16 is configured to perform one or more predetermined functions when activated. For example, in some embodiments, the second circuit component 16 is configured to receive the electromagnetic signal and generate a response signal, although it will be appreciated that the second circuit component can perform alternative and/or additional functions when activated. In some embodiments, a waveform of the electromagnetic signal is altered and/or transitioned from a first waveform to a second waveform in response to the one or more predetermined functions performed by the second circuit component 16. For example, in some embodiments, the second circuit component 16 generates a response signal when transitioned to an active state. The response signal is received by the electromagnetic signal source, which transitions the electromagnetic signal from a first waveform to a second waveform.

In some embodiments, when the electromagnetic signal exceeds a third signal strength, the first inductor 4 generates a first signal having a voltage equal to the transition voltage. The first circuit component 12 transitions from the first operational mode to the second operational mode when the voltage of the first signal is equal to or greater than the transition voltage. In some embodiments, the second operational state of the first circuit component 12 provides a second indicator corresponding to activation of the second circuit component 16. The second indicator can be any suitable indicator, such as one or more of a visual, audible, tactile, and/or other sensory indicator. For example, in some embodiments, the first circuit component 12 includes a light-emitting diode (LED) configured to provide a visual indicator when the second circuit component 16 is activated (for example, by exposure to an electromagnetic signal having a sufficient signal strength to activate the second circuit component 16), although it will be appreciated that any suitable circuit component can provide any suitable feedback.

In some embodiments, one or more elements of the electronic card 2 are generated as printed circuit elements. For example, in some embodiments, the inductors are printed using conductive inks onto a substrate to generate one or more printed circuits. The printed circuits can be coupled to one or more additional layers to form the electronic card 2. In some embodiments, the electronic card 2 can include additional components (not shown) such as a battery, a display, a one-time password circuit (such as a button, chip, and/or other components), and/or any other additional components.

In some embodiments, the electronic card 2 is an electronic payment card. The first circuit component 12 is a feedback component, such as an LED, and the second circuit component 16 is an integrated circuit configured to provide one or more payment processes, such as an NFC chip. The feedback component includes one or more jumper elements configured to control operation thereof, such as a resistive control circuit. Although specific embodiments are discussed herein, it will be appreciated that the feedback component can include any suitable circuit component (such as an LED, a speaker, a piezoelectric element, a heating element, a display element, etc., or any combination thereof) having any suitable control circuit (such as a resistive control circuit, a capacitive control circuit, a digital control circuit, a digital-analog control circuit, etc., or any combination thereof). Further, although embodiments are discussed including a feedback component as a first circuit component 12 and an integrated circuit as a second circuit component 16, it will be appreciated that the first circuit component 12 can alternatively and/or additionally include an integrated circuit and the second circuit component can alternatively and/or additionally include a feedback component, and is within the scope of this disclosure.

In some embodiments, the feedback component is configured to operate in a first mode when the electronic card 2 is exposed to an electromagnetic signal having a first signal strength. The first operational mode includes a first indicator generated by the feedback component. For example, in embodiments including an LED, the first operational mode can correspond to intermittent operation of the LED and/or operation of a first color or wavelength LED. As another example, in embodiments including a speaker, the first indicator can be a first sound or tone. The first indicator indicates the presence of the electromagnetic signal having a signal strength between the first power and the second power. For example, in some embodiments, the feedback component transitions to the first operational mode when a first signal generated by a first inductor 4 has a voltage equal to or greater than a first threshold voltage. In some embodiments, the voltage of the first signal is related to the signal strength of the electromagnetic signal.

In some embodiments, the first operational mode of the feedback component includes intermittent operation. For example, in embodiments including an LED, the first operational mode of the LED can be an intermittent illumination (or blinking). The intermittent operation of the feedback component indicates that the presence of an electromagnetic signal to the user of the electronic card 2. In some embodiments, the frequency and/or intensity of the intermittent operation can increase as the signal strength of the electromagnetic signal increases (for example, due to a reduction in distance between the electronic card 2 and the electromagnetic signal source). For example, as the signal strength of the electromagnetic signal increases, the voltage of the first signal provided to the feedback component increases, causing the frequency and/or intensity of the intermittent operation to increase.

In some embodiments, the second inductor 6 is coupled to a second circuit component 16 including an integrated circuit. The integrated circuit transitions to an active state when the electronic card 2 is exposed to an electromagnetic signal having a second signal strength. For example, in some embodiments, the integrated circuit transitions an active state when a second signal generated by the second inductor 4 has a voltage equal to or greater than a second threshold voltage. In some embodiments, the voltage of the second signal is related to the signal strength of the electromagnetic signal.

The integrated circuit performs one or more predetermined functions in an active state. For example, in some embodiments, the integrated circuit is an NFC chip generates a payment signal when transitioned to an active state. In some embodiments, the signal strength of the electromagnetic signal corresponds to a distance from the electromagnetic signal source, although it will be appreciated that the signal strength can be related to a power input to the electromagnetic signal source, a distance from the electromagnetic signal source, a size of the second inductor 6, an orientation of the second inductor 6, etc., and/or any other combination thereof.

In some embodiments, the feedback component transitions to a second operational mode when the electromagnetic signal has a third signal strength. The second operational mode is configured to indicate activation of the second circuit component 16. The second operational mode indicates that the signal strength of the electromagnetic signal is sufficient to activate the integrated circuit to perform one or more functions. For example, in some embodiments, the second operational mode indicates that the electronic card 2 and the electromagnetic signal source are close enough to complete a data exchange, such as an exchange between an NFC chip and an NFC reader. In some embodiments, the feedback component transitions to the second operational mode when the first signal generated by the first inductor 4 has a voltage equal to or greater than transition voltage. In some embodiments, the voltage of the first signal is related to the signal strength of the electromagnetic signal.

The second operational mode can include any suitable operational mode different than the first operational mode. For example, in embodiments including an LED, the second operational mode can correspond to steady-state operation of the LED and/or operation of a second color or wavelength LED. As another example, in embodiments including a speaker, the second indicator can be a second sound or tone. The second indicator can be configured to indicate a signal strength of the electromagnetic signal greater than or equal to the second signal strength and/or the third signal strength.

Figure 2:
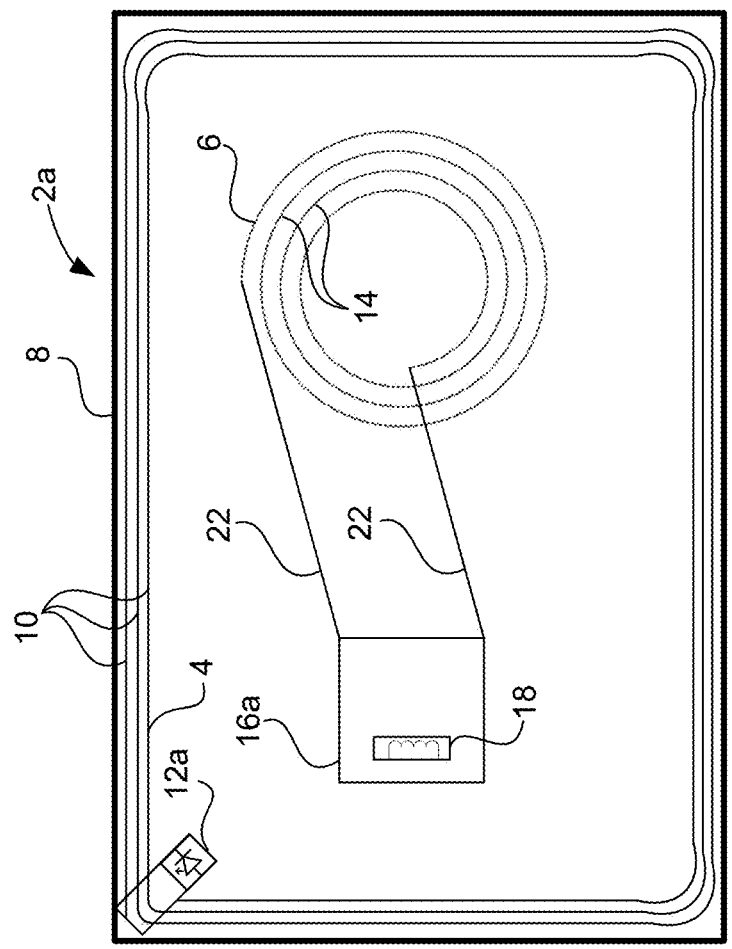
FIG. 2 illustrates an electronic card including a light-emitting diode coupled to a first inductor and an integrated circuit coupled to a second inductor, in accordance with some embodiments.
Figure 2:
Figure 2:
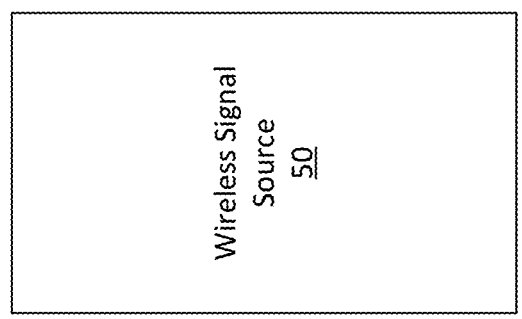

FIG. 2 illustrates an electronic payment card 2a having a first circuit component 12a and a second circuit component 16a positioned near an electromagnetic signal source 50, in accordance with some embodiments. The electronic payment card 2a is similar to the electronic card 2 discussed in conjunction with FIG. 1, and similar description is not repeated herein. In some embodiments, the first circuit component 12a includes a feedback component, such as an LED, and the second circuit component 16a includes an integrated circuit, although it will be appreciated that first circuit component 12a and the second circuit component 16a can include any suitable circuit components.

The electromagnetic signal source 50 is configured to generate an electromagnetic signal 52. The signal strength of the electromagnetic signal 52 decreases as a distance $X_1$ from the electromagnetic signal source 50 increases. In some embodiments, the electromagnetic signal source 50 is an NFC reader, although it will be appreciated that the electromagnetic signal source 50 can be any suitable signal source, such as an NFC signal source, a BLE signal source, an RFID signal source, a WiFi signal source, etc. For example, in some embodiments, the electromagnetic signal source is an NFC device, such as an NFC enabled point-of-sale terminal, an NFC enabled mobile device, an NFC wearable device, an NFC ingestible/implantable device, and/or any other suitable NFC device.

In some embodiments, the first circuit component 12a includes an LED configured to provide a visual indication of operation of the second circuit component 16a to a user of the electronic card 2a. For example, in some embodiments, the first inductor 4a is configured to generate a first signal having a first activation voltage when the signal strength of the electromagnetic signal 52 is equal to or greater than a first strength threshold (for example, at a first distance from the electromagnetic signal source 50). The first signal transitions the first circuit component 12a from an off-state to a first operational mode. The first operational mode includes intermittent illumination (e.g., blinking) of the LED, activation of the LED 12a at a first color or wavelength, and/or any other suitable visual indication. The first operational mode provides a user with visual feedback that the electromagnetic signal 52 generated by the electromagnetic signal source 50 has a first signal strength as received by the electronic card 2.

As the user moves the electronic card 2a closer to the electromagnetic signal source 50 (i.e., as the distance $X_1$ is reduced), the signal strength of the electromagnetic signal 52 increases. The increase in the signal strength of the electromagnetic signal 52 corresponds to an increase in the voltage generated by the first inductor 4a and the second inductor 6a. In some embodiments, the first operational mode of the first circuit component 12a can be adjusted in response to an increased voltage generated by the first inductor 4a. For example, in embodiments including intermittent illumination of an LED, the frequency of the intermittent illumination can be increased to provide a visual indicator to a user that the signal strength of the electromagnetic signal 52 is increasing (e.g., that a user is moving the electronic card 2a in a suitable direction to activate the second circuit element 16a). As another example, in some embodiments, the intensity (or brightness) of the first operational mode of the LED can be increased as the voltage generated by the first inductor 4a increases.

When the user reduces the distance $X_1$ such that the signal strength of the electromagnetic signal 52 is equal to or greater than a second threshold, the second inductor 6a generates a second signal having a second activation voltage. The second signal transitions the second circuit component 16a to an active mode. In active mode, the second circuit component 16a receives the electromagnetic signal 52, generates a response signal including transaction information, and transmits the response signal to the electromagnetic signal source 50, for example, using an inductive winding 18. The response signal can provide the electromagnetic signal source 50 with necessary data to complete a transaction, such as a payment transaction, a verification transaction, and/or any other suitable transaction.

In some embodiments, when the signal strength of the electromagnetic signal 52 is equal to or greater than a third strength threshold (for example, due to a reduction in $X_1$), the first circuit component 12a transitions from the first operational mode to a second operational mode. In some embodiments, the third strength threshold is greater than or equal to the second strength threshold such that the first circuit component 12a transitions to the second operational mode only after the second circuit component 16a has been activated. In some embodiments, the second operational mode provides a visual indication to a user that the electromagnetic signal 52 has a signal strength sufficient to complete a data exchange between the electronic card 2a and the electromagnetic signal source 50. Although a specific embodiment has been discussed herein, it will be appreciated that the first circuit component 12a, the second circuit component 16a, and/or additional components can be configured to activate in any predetermined order and/or at any predetermined distance.

In some embodiments, the first circuit component 12a includes one or more LEDs configured to generate a plurality of colors (or wavelengths) of light. The first operational mode can include operation of a first color and the second operational mode can include operation of a second color. For example, in some embodiments, the first circuit component 12a includes a resistive circuit (not shown). The resistive circuit is configured to provide activation of a first color when the first signal has a voltage equal to the first activation voltage. When the voltage of the first signal is equal to or greater the transition voltage, the first circuit component 12a transitions to a second color. In some embodiments, the first circuit component 12a includes a plurality of LEDs each activated at a different voltage.

Figure 3:
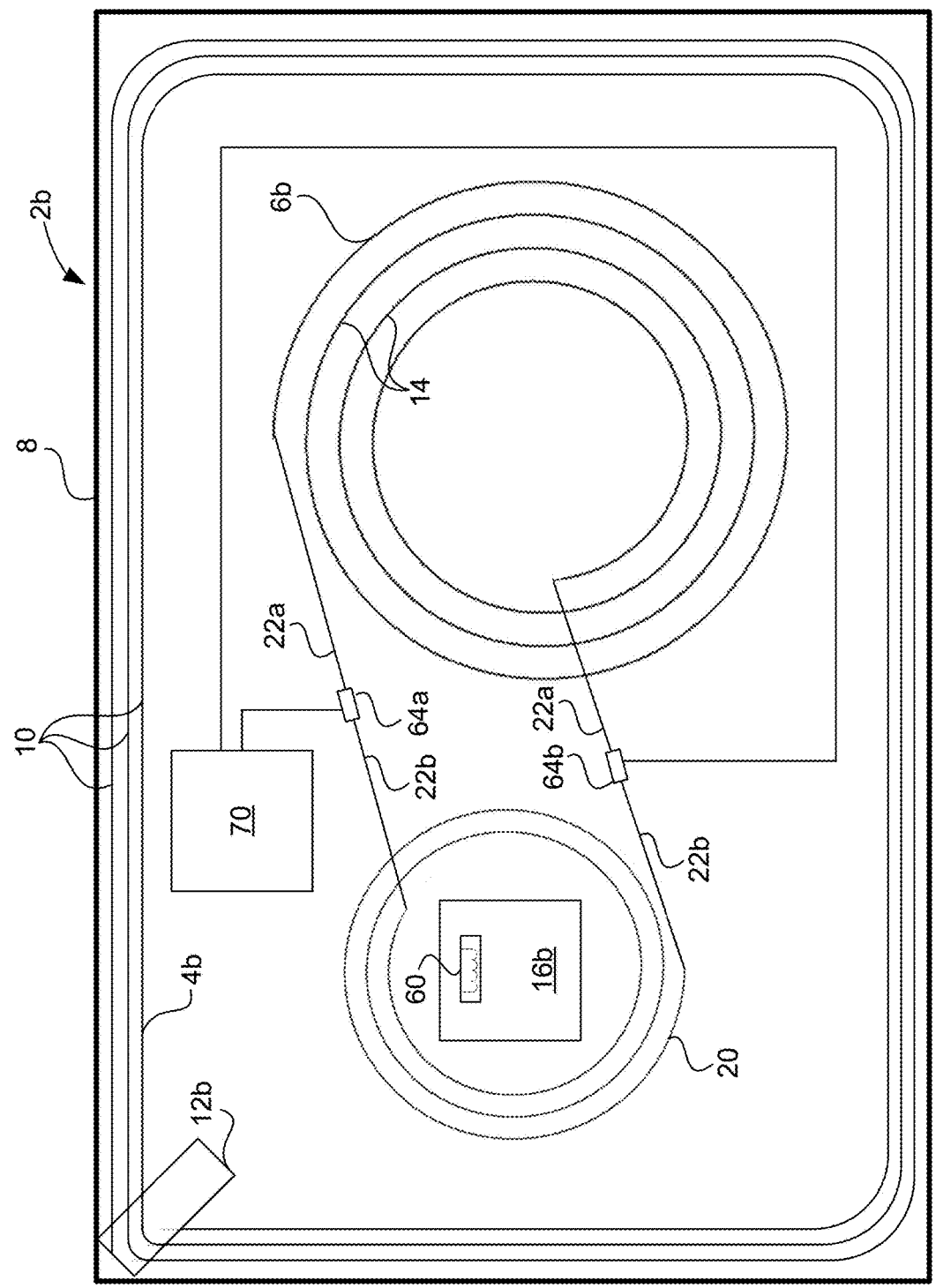
FIG. 3 illustrates an electronic card including a first circuit component coupled to a first inductor and a second circuit component inductively coupled to a second inductor, in accordance with some embodiments.

FIG. 3 illustrates one embodiment of an electronic card 2b including a first inductor 4b, a second inductor 6b, and a third inductor 20. The electronic card 2b is similar to the electronic card 2 discussed in conjunction with FIG. 1, and similar description is not repeated herein. In some embodiments, the third inductor 20 is configured to provide inductive coupling between the second circuit component 16b and the second inductor 6b. The third inductor 20 can be configured to isolate the second circuit component 16b from second inductor 6b, increase or decrease the second signal strength for activation of the second circuit component 16b, and/or convert a signal generated by the second inductor 6b to a signal suitable for receipt by the second circuit component.

In some embodiments, the third inductor 20 is coupled to the second inductor 6b by a plurality of wires 22. The second inductor 6b generates a second signal when exposed to the electromagnetic signal generated by the electromagnetic source and provides the generated signal to the third inductor 20. The third inductor 20 generates an inductive field about the second circuit component 16b in response to the second signal received from the second inductor 6b. The second circuit component 16b includes an inductive coupling 60 therein configured to inductively couple the second circuit component 16b to the field generated by the third inductor 20.

In some embodiments, the third inductor 20 is configured to generate an inductive field sufficient to activate the second circuit component 16b when a voltage of the second signal generated by the second inductor 6 is equal to or greater than a second threshold voltage. In some embodiments, the second threshold voltage corresponds to a predetermined distance between the electronic card 2b and an electromagnetic signal source. The second inductor 6b and/or the third inductor 20 can be configured to increase and/or decrease the signal strength required for activation of the second circuit component 16b, for example, by varying one or more of the number of windings, the inductive profile, the orientation, etc. of the second inductor 6b and/or the third inductor 20.

In some embodiments, one or more jumper elements 62a, 62b are electrically coupled between the second inductor 6 and the third inductor 20. The jumper elements 62a, 62b are configured to selectively couple the second inductor 6b to the third inductor 20. The jumper elements 62a, 62b prevent undesirable and/or unwanted operation of the second circuit component 12b. For example, in some embodiments, the jumper elements 62a, 62b decouple the second inductor 6b and the third inductor 20 when the electronic card 2b is in storage to prevent incidental operation of the second circuit component 12b. In some embodiments, the jumper elements 62a, 62b decouple the second inductor 6b and the third inductor 20 until an activation operation is performed, such as, for example, a button press or other user interaction with the electronic card 2b. In some embodiments, the jumper elements 62a, 62b are omitted and the second conductive loop 6b is directly coupled to the third inductor 20. The jumper elements 62a, 62b can include any suitable jumper elements, such as, for example, diodes, transistors, switches, and/or any other suitable control element.

In some embodiments, the electronic card 2b includes a control circuit 70 configured to selectively couple the second inductor 6b to the third inductor 20. The control circuit 70 receives one or more inputs from a user and/or additional circuit components and selectively couples the second inductor 6b to the third inductor 20 when a predetermined condition is met. For example, in some embodiments, the control circuit 70 is configured receive an input signal from a button coupled to the electronic card 2b. When a user pushes the button, the control circuit 70 generates control signals for the jumper elements 62a, 62b to electrically couple the second inductor 6b to the third inductor 20. The voltage generated by the second inductor 6b is passed to the third inductor 20 for inductive activation of the second circuit component 16b. If the electronic card 2b is exposed to an electromagnetic signal without the user pushing the button (i.e., without the control circuit 70 generating control signals), the second inductor 6b is not coupled to the third inductor 20 and the second circuit component 16b is therefore not inductively activated. In various embodiments, an activation operation includes receiving an activation signal from a third circuit component (such as a button), receiving a one-time pass code (OTP) from a third circuit component, and/or any other suitable activation operation.

Figure 4:
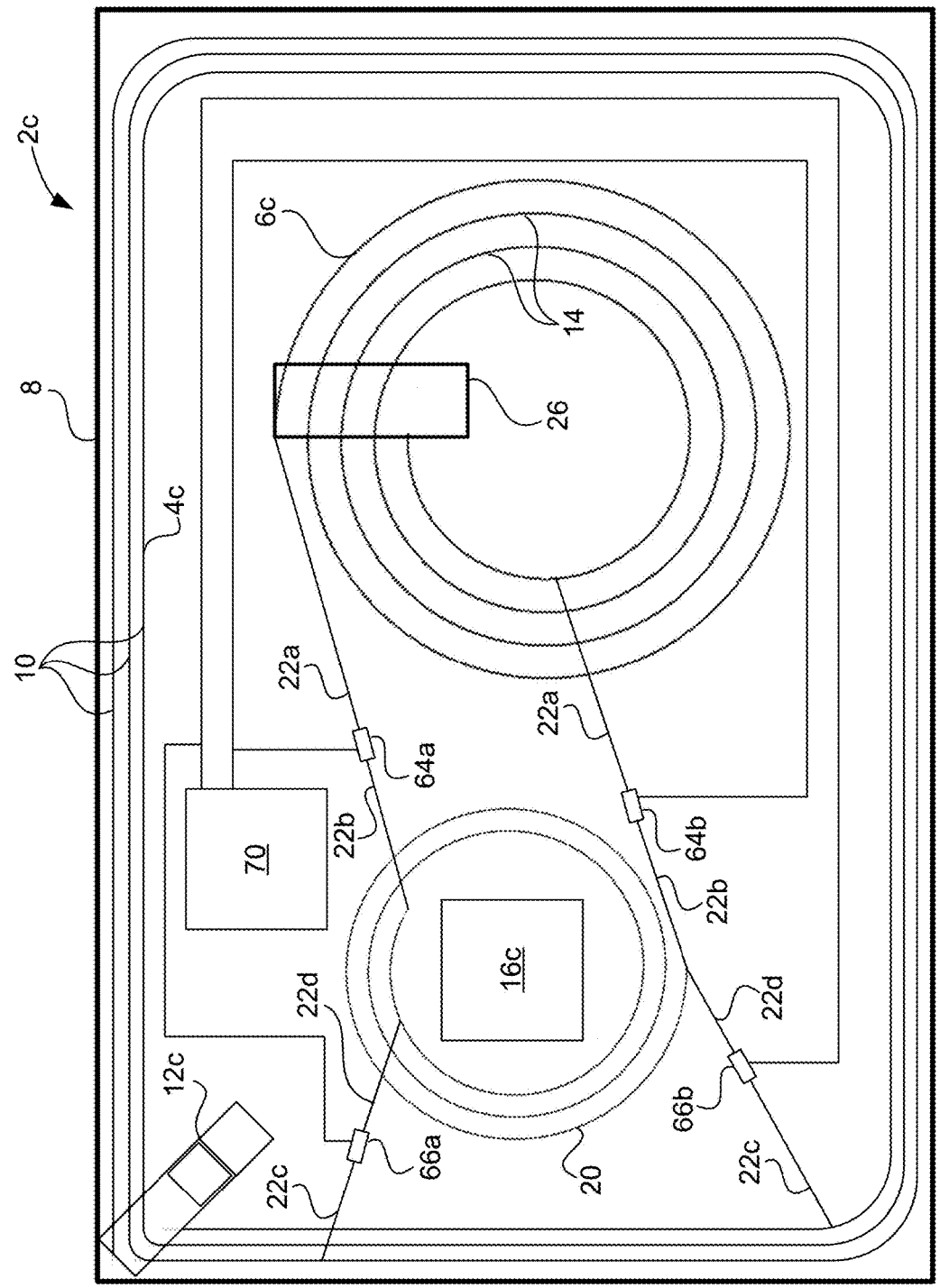
FIG. 4 illustrates an electronic card including a first circuit component coupled to a first inductor, a second circuit component inductively coupled to a second inductor, and a third circuit component coupled to a third inductor, in accordance with some embodiments.

FIG. 4 illustrates one embodiment of an electronic card 2c including a third inductor 20a coupled to each of the first inductor 4c and the second inductor 6c. The electronic card 2c is similar to the electronic card 2b discussed in conjunction with FIG. 3 and similar description is not repeated herein. In some embodiments, the third inductor 20a is coupled to each of the first inductor 4c and the second inductor 6c by respective pairs of wires 22a, 22b (or conductive traces). A first set of jumper elements 64a, 64b are coupled between the third inductor 20 and the first inductor 4c and a second set of jumper elements 66a, 66b are coupled between the third inductor 20 and the second inductor 6c.

In some embodiments, the first set of jumper elements 64a, 64b and the second set of jumper elements 66a, 66b are configured to selectively couple one of the first inductor 4c or the second inductor 6c to the third inductor 20. The first and second sets of jumper elements 64a-66b allow the electronic card 2b to be reconfigured for multiple operations prior to and/or during exposure to an electromagnetic signal. For example, in some embodiments, a control circuit (not shown) can be configured to selectively couple the first inductor 4c and/or the second inductor 6c to the third inductor 20. The third inductor 20 inductively couples the selected one of the first inductor 4c and/or the second inductor 6c to the second circuit component 16c.

In some embodiments, a first circuit component 12c is coupled to the first inductor 4, a second circuit component 16c is inductively coupled to the third inductor 20, and a third circuit component 26 is coupled to the second inductor 6. Each of the first circuit component 12c, the second circuit component 16c, and/or the third circuit component 26 can be selectively activated. For example, in some embodiments, the second circuit component 16c is selectively activated by coupling one of the first inductor 4 and/or the second inductor 6c to the third inductor 20. When the selected one of the first inductor 4c and/or the second inductor 6c generate a voltage greater than a second threshold voltage, the second circuit component 16c is transitioned to an on state to perform one or more functions. In some embodiments, the functions performed by the second circuit component 16c are selected based on which of the first inductor 4c and/or the second inductor 6c is coupled to the third inductor 20. In some embodiments, the first circuit component 12c, the second circuit component 16c, and/or the third circuit component 26 can be disconnected to provide additional power and/or selective operation of the remaining circuit components 12c, 16c, 26. For example, in some embodiments, the third circuit component 26 can be disconnected from the second inductor 6c when the second inductor 6c is coupled to the third inductor 20.

In some embodiments, the selected one of the first inductor 4c and/or the second inductor 6c coupled to the third inductor 20 is dependent on an operational mode of the electronic card 2c. For example, in some embodiments, the second circuit component 16c is an integrated circuit capable of two or more functions. In a first operational mode, the second circuit component 16c is configured to perform a first function and is coupled to the first inductor 4c. The first inductor 4c provides a first signal having a voltage greater than a first voltage threshold and/or a transition threshold to the first circuit component 12c and/or a second threshold voltage to the second circuit component 16c. In some embodiments, the first circuit component 12c is disconnected from the first inductor 4c. When the voltage generated by the first inductor 4c is equal to or greater than a second threshold voltage, the second circuit component 16c is transitioned to an on state and performs the first function.

Similarly, in a second operational mode, the second circuit component 16c is configured to perform a second function and is coupled to the second inductor 6c. The second inductor 6c provides a second activation voltage to the second circuit component 16c and/or a third activation voltage to the third circuit component 26. In some embodiments, the third circuit component 26 is disconnected from the second inductor 6c in the second operational mode. When the voltage generated by the second inductor 6c is equal to or greater than the second activation threshold, the second circuit component 16c is transitioned to an on state and performs the second function.

In some embodiments, each of the first circuit component 12c, the second circuit component 16c, and the third circuit component 26 have a predetermined priority of operation. For example, in some embodiments, the second circuit component 16c has a first priority such that the second circuit component 16c is activated prior to and/or preferentially to the first circuit component 12c and/or the third circuit component 26. The first circuit component 12c can have a second priority such that the first circuit component is activated prior to and/or preferentially to the third circuit component 26, but not prior to and/or preferentially to the second circuit component 16c. The third circuit component 26 can have a third priority and is activated last and/or with a lowest preference. Although specific embodiments are discussed herein, it will be appreciated that the circuit components 12c, 16c, 26 can have any suitable order of priority and/or shared priority and are within the scope of this disclosure.

Figure 5:
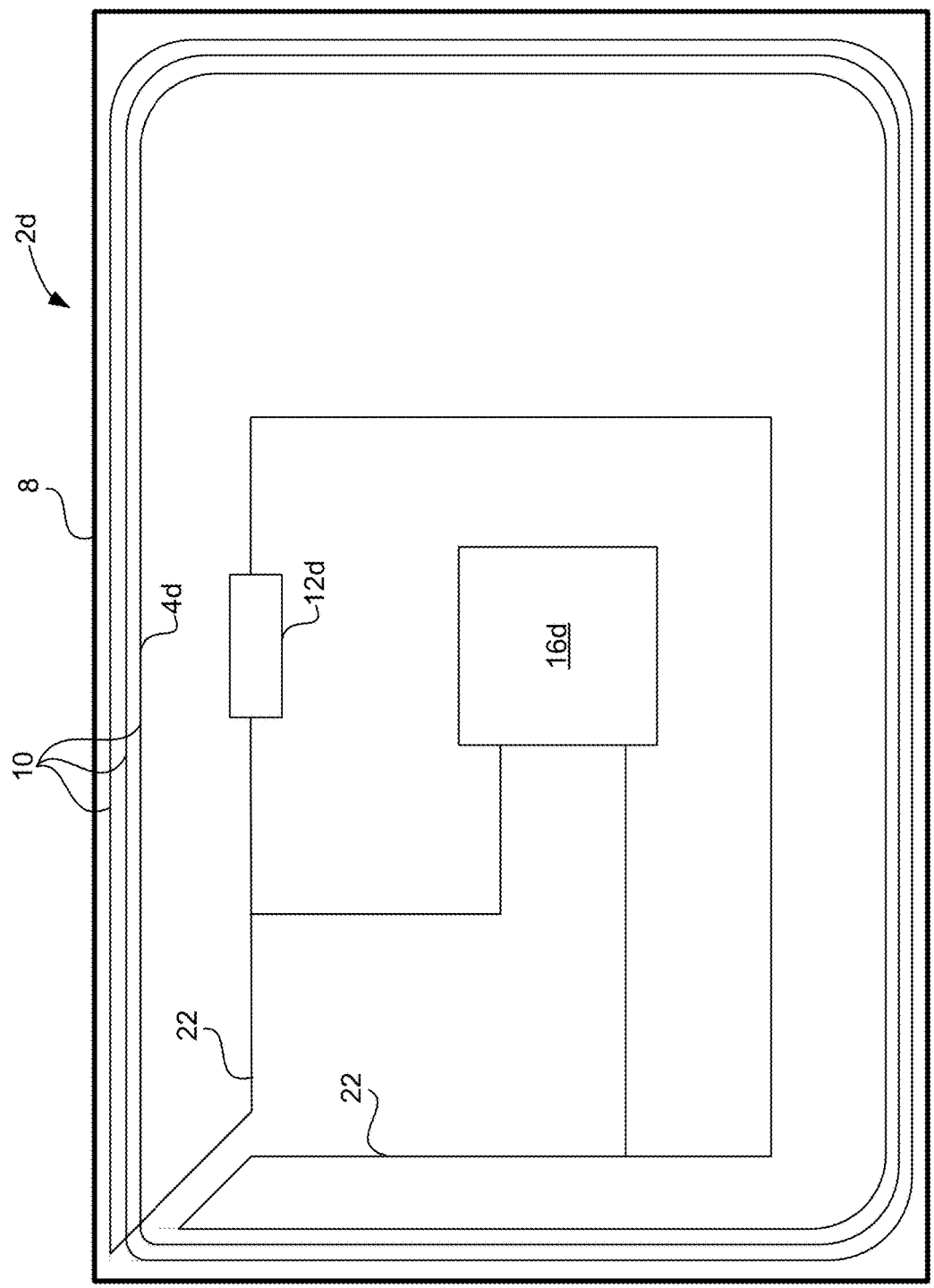
FIG. 5 illustrates an electronic card including a first circuit component and a second circuit component coupled to a first inductor, in accordance with some embodiments.

FIG. 5 illustrates an electronic card 2d including a first circuit component 12d and a second circuit component 16d each coupled to a first inductor 4d. The electronic card 2d is similar to the electronic card 2 discussed in conjunction with FIG. 1, and similar description is not repeated herein. The first inductor 4 is configured to receive an electromagnetic signal having a first waveform. At least one of the first circuit component 12d and/or the second circuit component 16d is configured to detect the first waveform of the electromagnetic signal and transition to a first mode of operation. For example, in some embodiments, the first circuit component 12d is configured to detect a waveform of the electromagnetic signal received by the first inductor 4d and transition to a first operational mode. The first operational mode can by any suitable operational mode, such as an intermittent, a steady-state, and/or a predetermined operational mode. In some embodiments, the first circuit component 12d transitions to the first operational mode when the received electromagnetic signal has a first waveform and exceeds a predetermined signal strength, such as a first signal strength.

In some embodiments, the first circuit component 12d and/or the second circuit component 16d are configured to transition to a second mode of operation when the first inductor 4d receives an electromagnetic signal having a second waveform. For example, in some embodiments, the first circuit component 12d is configured to detect a waveform of the electromagnetic signal and transition to a second mode of operation when the second waveform is detected. The second operational mode can be any suitable operational mode, such as an intermittent, a steady-state, and/or a predetermined operational mode. In some embodiments, the first circuit component 12d transitions to the second operational mode when the received electromagnetic signal has a second waveform and exceeds a predetermined signal strength, such as a first signal strength or a second signal strength.

In some embodiments, the first circuit component 12d and/or the second circuit component 16d are configured to transition to an active mode and perform one or more predetermined functions when the first inductor 4d receives an electromagnetic signal having a first waveform and a predetermined signal strength, such as a second signal strength. For example, in some embodiments, the second circuit component 16d is configured to detect a waveform of the electromagnetic signal and transition to an active mode when the first waveform is detected and the signal strength of the electromagnetic signal exceeds a second strength threshold. The active operation mode can include any suitable operational mode, such as transmission of data to a remote source (such as the electromagnetic signal source), one or more predetermined functions, and/or any other suitable operation. In some embodiments, the first circuit component 12d is a discrete circuit component (such as an LED, RFID tag, etc.) and the second circuit component 16d is an integrated circuit (such as an NFC chip), although it will be appreciated that the first circuit component 12d and/or the second circuit component 16d can include any suitable circuit components and is within the scope of this disclosure.

In some embodiments, the electromagnetic signal transitions from the first waveform to a second waveform in response to activation of the second circuit component 16d. For example, in some embodiments, the first inductor 4d detects an electromagnetic signal having a first waveform.

The electromagnetic signal is provided to the first circuit component 12d and the second circuit component 16d. When the signal strength of the electromagnetic signal exceeds a first strength threshold (e.g., the first inductor 4d generates a first signal having a voltage greater than or equal to a first threshold voltage), the first circuit component 12d transitions to a first operational mode. The signal strength of the electromagnetic signal is increased, for example, by moving the electronic card 2d closer to an electromagnetic signal source. When the signal strength of the electromagnetic signal exceeds a second strength threshold (e.g., the first inductor 4d generates a first signal having a voltage equal to or greater than a second threshold voltage), the second circuit component 16d transitions to an active mode and transmits a response signal to the electromagnetic signal source. After receiving the response signal, the electromagnetic signal source changes the waveform of the electromagnetic signal from the first waveform to a second waveform. The second waveform is detected by the first circuit component 12d, which transitions to a second operational mode. For example, in some embodiments, the first operational mode is an intermittent operation and the second operational mode is a steady-state operation.

Figure 6A:
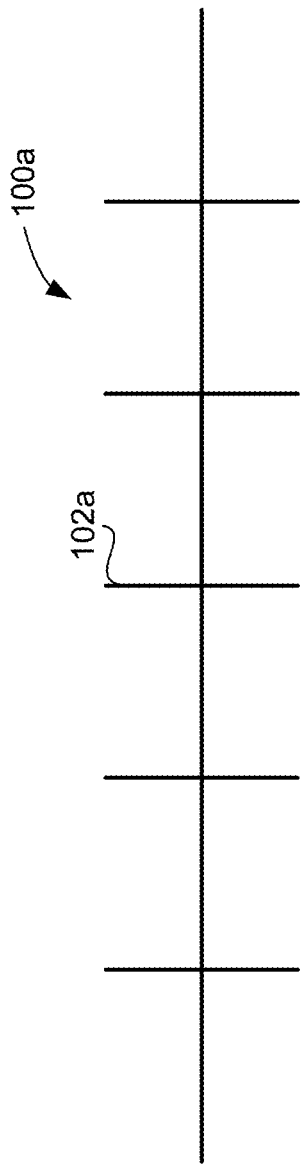
FIG. 6A illustrates an electromagnetic signal prior to a connection being established between a second component of the electronic card of FIG. 5 and an electromagnetic signal source, in accordance with some embodiments.
Figure 6B:
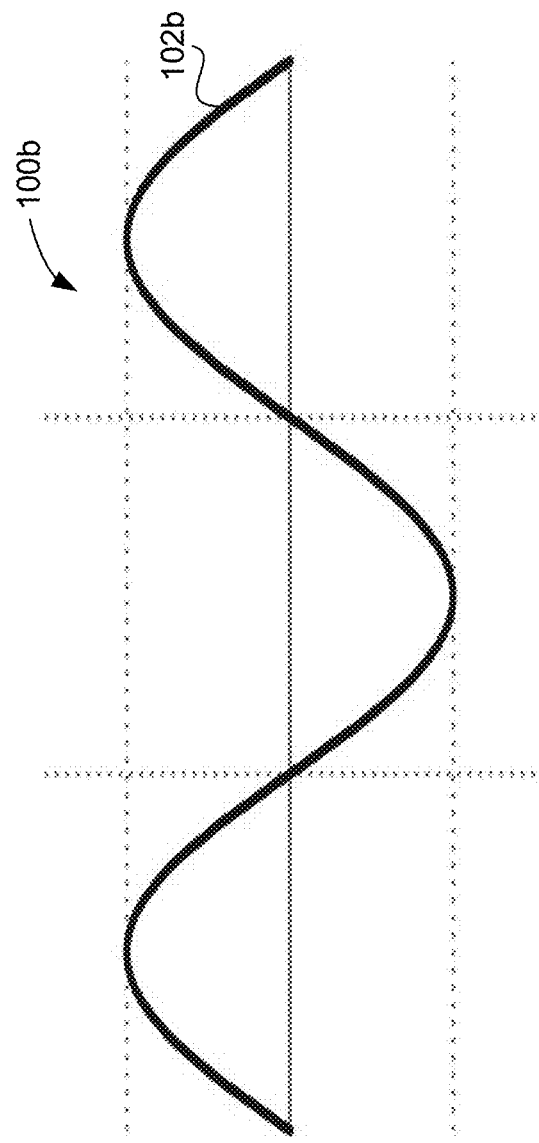
FIG. 6B illustrates an electromagnetic signal after a connection is established between a second component of the electronic card of FIG. 5 and an electromagnetic signal source, in accordance with some embodiments.

FIG. 6A illustrates an electromagnetic signal 100 having a first waveform 102a, in accordance with some embodiments. The first waveform 102a can be any suitable electromagnetic waveform. For example, in the illustrated embodiment, the first waveform is a pulsed waveform. In some embodiments, the first circuit component 12d and/or the second circuit component are configured to detect the first waveform 102a and transition to a first operational mode. In some embodiments, the second circuit component 16d transitions to an active mode and generates a response signal that is transmitted to the electromagnetic signal source. After activation of the first circuit component 12d and/or the second circuit component 16d, the electromagnetic signal transitions to a second waveform 102b as illustrated in FIG. 6B. For example, in some embodiments, the electromagnetic signal source receives a response signal from the second circuit component 16d and changes the waveform of the electromagnetic signal from the first waveform 102a to the second waveform 102b. Although embodiments having specific waveforms are illustrated herein, it will be appreciated that the first waveform 102a and/or the second waveform 102b can be any suitable electromagnetic waveform and is within the scope of this disclosure.

Figure 7:
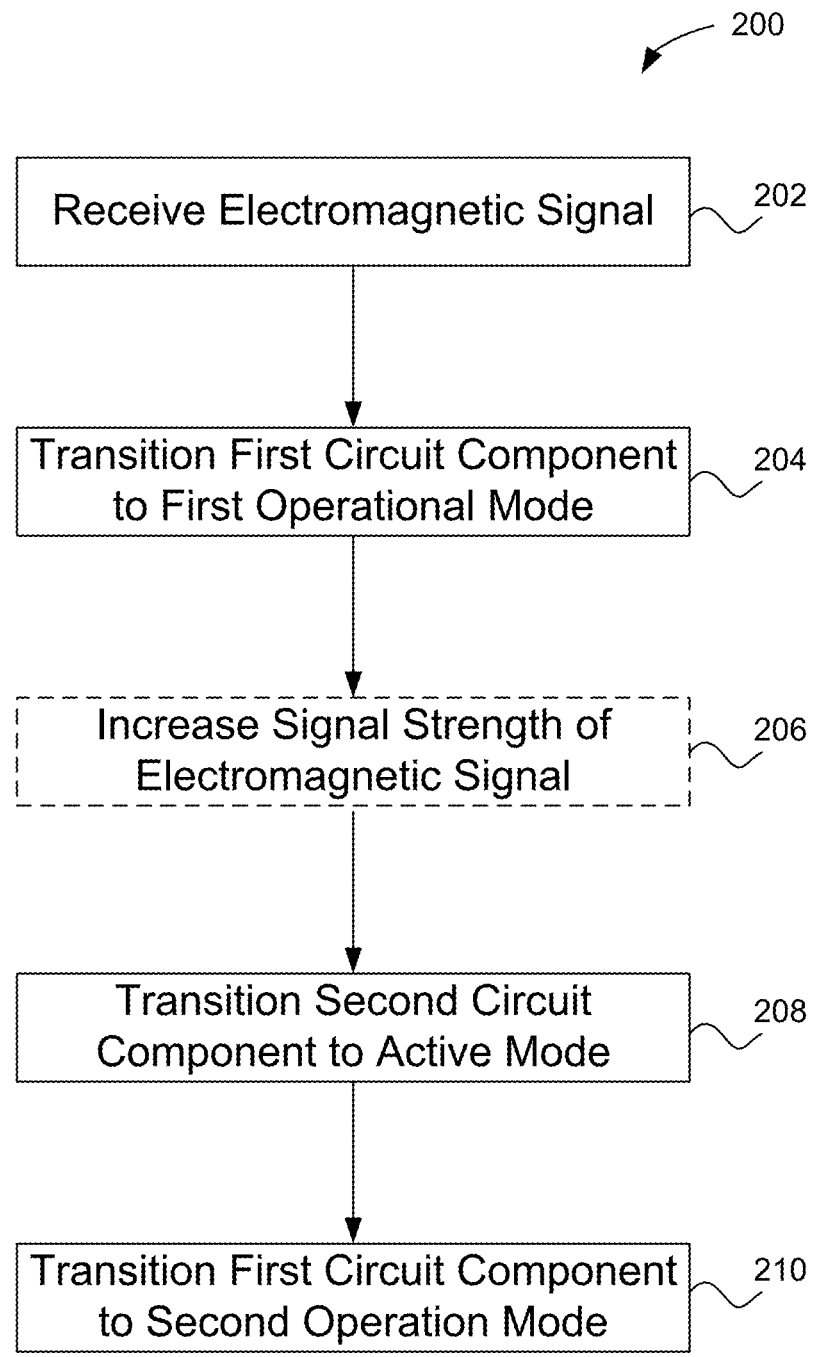
FIG. 7 illustrates a method of using a dual interface electronic credential card, in accordance with some embodiments.

FIG. 7 is a flowchart illustrating a method 200 of operating an electronic card, in accordance with some embodiments. Although embodiments are discussed herein including the electronic card 2, it will be appreciated that the method 200 can be applied to any of the electronic cards 2-2e discussed in conjunction with FIGS. 1-6B. At step 202, the electronic card 2 is exposed to an electromagnetic signal. The electromagnetic signal can be generated by any suitable electromagnetic signal source, such as, for example, a point-of-sale device, a mobile device, a security device, a verification device, and/or any other suitable device configured to generate an electromagnetic signal. The electromagnetic signal can be generated according to one or more standards, such as NFC, BLE, RFID, WiFi, etc.

At step 204, a first circuit component 12 is transitioned to a first operational mode. The first circuit element 12 can be transitioned based on one or more features of the received electromagnetic signal, such as the signal strength, signal waveform, and/or any other suitable feature. For example, in some embodiments, the first circuit component 12 transitions to the first operational mode when a first signal generated by a first inductor 4 has a voltage greater than or equal to a first threshold voltage. The first signal has a voltage corresponding to the signal strength of the electromagnetic signal. In some embodiments, the strength of the electromagnetic signal is related to a distance between the electronic card 2 and an electromagnetic signal source. As the electronic card 2 is moved closer to the electromagnetic signal source, the signal strength of the electromagnetic signal increases. As another example, in some embodiments, the first circuit component 12 is transitioned to the first operational mode when the electromagnetic signal has a first waveform.

The first operational mode can include any suitable operational mode, such as, for example, an intermittent, steady-state, and/or predetermined mode of operation. In some embodiments, the first circuit component 12 is a feedback component, such as LED, speaker, piezoelectric component, etc. and is configured to provide a first indicator. The first indicator can provide visual, audible, tactile, and/or other sensory feedback to a user to indicate exposure of the electronic card 2 to the electromagnetic signal having one or more predetermined features. For example, in some embodiments, the first circuit component 12 is an LED and the first operational mode includes intermittent (or blinking) operation of the LED, although it will be appreciated that any suitable feedback element and first indicator can be used.

At optional step 206, a signal strength of the electromagnetic signal is increased. The signal strength of the electromagnetic signal can be increased by, for example, positioning the electronic card 2 closer to an electromagnetic signal source and/or increasing a signal strength provided to the electromagnetic signal source, although it will be appreciated that the signal strength of the electromagnetic signal can be increased by any suitable means.

At step 208, a second circuit component 16 is transitioned to an active mode. The second circuit component 16 is transitioned based on one or more features of the received electromagnetic signal, such as the signal strength, waveform, and/or any other suitable feature. For example, in some embodiments, the second circuit component 16 transitions to an active mode when a second signal generated by a first inductor 4 and/or a second inductor 6 has a voltage greater than or equal to a second threshold voltage. The voltage of the second signal is related to the signal strength of the electromagnetic signal. As another example, in some embodiments, the second circuit component 16 activated when the electromagnetic signal has a first waveform. Although specific embodiments are discussed herein, it will be appreciated that the second circuit component 16 can be activated in response to any suitable characteristics of the electromagnetic signal.

In some embodiments, the second circuit component is an integrated circuit configured to receive the electromagnetic signal and generate one or more response signals, although it will be appreciated that the second circuit component 16 can be configured to perform any suitable function(s), such as processing, transmission, storage, retrieval, and/or any other suitable function.

At step 210, the first circuit component 12 is transitioned to a second operational mode. The first circuit component 12 can be transitioned to the second operational mode in response to one or more features of the received electromagnetic signal. For example, in some embodiments, when the electromagnetic signal has a signal strength greater than or equal to a third strength threshold, the first circuit component 12 transitions to the second operational mode. The third strength threshold is equal to or greater than the second strength threshold. As another example, in some embodiments, the first circuit component 12 is transitioned when the electromagnetic signal has a second waveform. The electromagnetic signal can transition from the first waveform to the second waveform in response to activation of the second circuit component 16, for example, after receiving a response signal from the second circuit component 16. Although specific embodiments are discussed herein, it will be appreciated that the first circuit component 12 can be transitioned in response to any suitable characteristics of the electromagnetic signal.

The second operational mode can include any suitable operational mode, such as, for example, an intermittent, steady-state, and/or predetermined mode of operation. In some embodiments, the first circuit component 12 is a feedback component, such as LED, speaker, piezoelectric component, etc. and is configured to provide a second indicator in a second operational mode. The second indicator can provide visual, audible, tactile, and/or other sensory feedback to a user to indicate exposure of the electronic card 2 to the electromagnetic signal having one or more predetermined features. For example, in some embodiments, the first circuit component 12 is an LED and the second operational mode includes steady-state operation of the LED, although it will be appreciated that any suitable feedback element and second indicator can be used.

Figure 8:
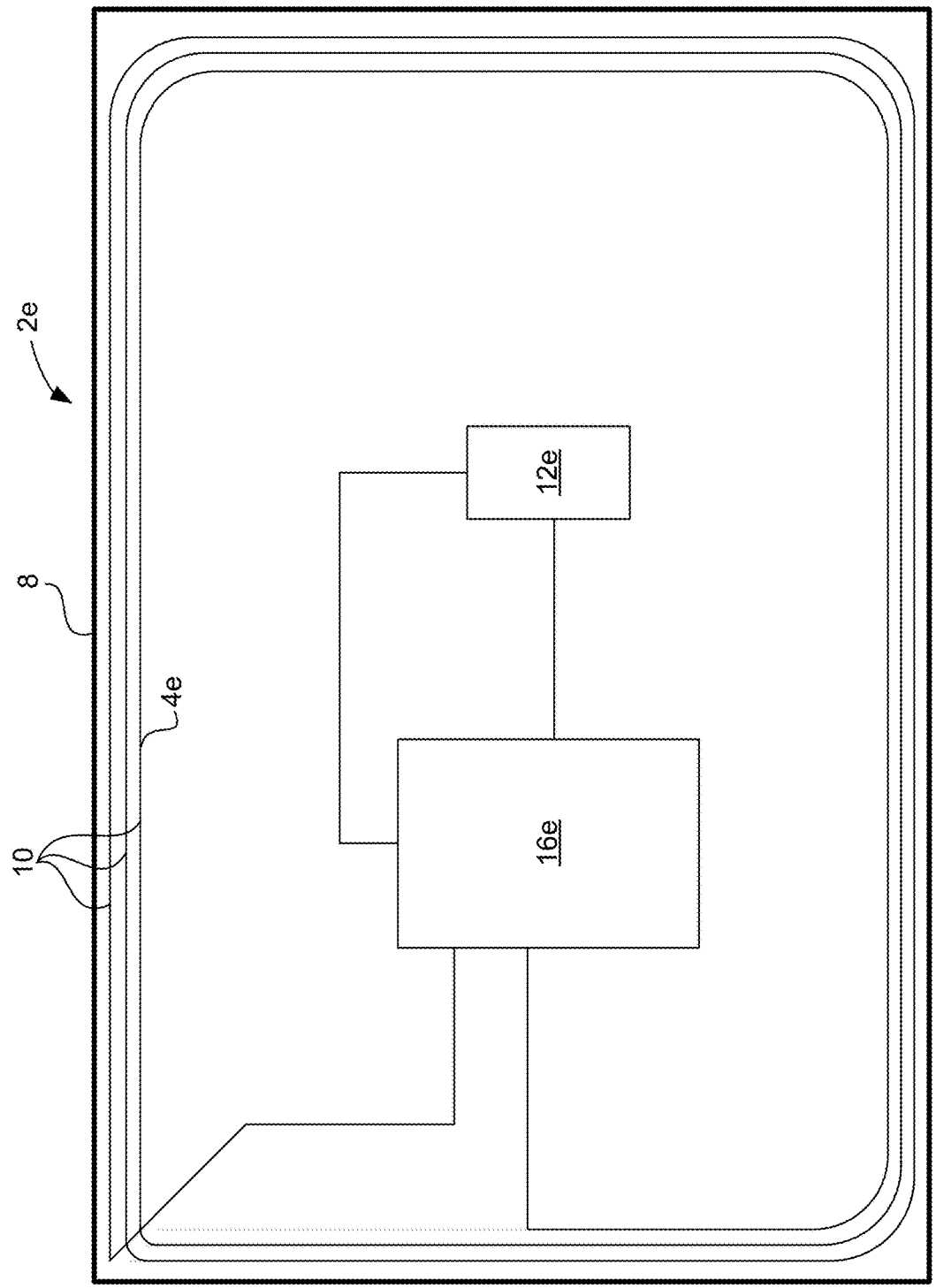
FIG. 8 illustrates an electronic card comprising an integrated circuit and a first indicator component, in accordance with some embodiments.

FIG. 8 illustrates an electronic card 2e including a first circuit component 12e and a second circuit component 16e each coupled to a first inductor 4e, in accordance with some embodiments. The electronic card 2e is similar to the electronic card 2d discussed in conjunction with FIG. 5, and similar description is not repeated herein. The second circuit component 16e is coupled to and configured to control operation of the first circuit component 12e. The first inductor 4e is configured to generate a signal when the electronic card 2e is exposed to an electromagnetic signal. When the voltage of the first signal is greater than or equal to a threshold voltage, the second circuit component 16e is activated and performs one or more predetermined functions. For example, in some embodiments, the second circuit component 16e is configured to transmit a response signal, although it will be appreciated that the second circuit component 16e can perform any suitable functions.

In some embodiments, the second circuit component 16e is configured to activate the first circuit component 12e prior to, simultaneously with, and/or after being transitioned to an on state and performing the one or more functions. For example, in some embodiments, the second circuit component 16e is configured to activate the first circuit component 12e in a first operational mode when a voltage of the signal generated by the first inductor 4e is equal to or greater than a first threshold voltage and transition the first circuit component 12e to a second operational mode when the voltage of the signal generated by the first inductor 4 is equal to or greater than a second threshold voltage. The second threshold voltage is greater than the first threshold voltage. In some embodiments, when the signal generated by the first inductor 4e has a voltage greater than or equal to the second threshold voltage, the second circuit component 16e performs the one or more predetermined functions.

In some embodiments, the second circuit component 16e is configured to control operation of the first circuit component 12e based on the one or more functions performed by the second circuit component 16e. For example, in some embodiments, the second circuit component 16e is configured to transition the first circuit component 12e to a first operational mode when the second circuit component 16e is initially activated, and prior to performing the one or more functions. After performing the one or more functions, the second circuit component 16e transitions the first circuit component to a second operational mode. Although specific embodiments are discussed herein, it will be appreciated that the second circuit component 16e can transition the first circuit component to the first operational mode and/or the second operational mode in response to one or more functions and/or inputs of the second circuit component 16e.

Figure 9:
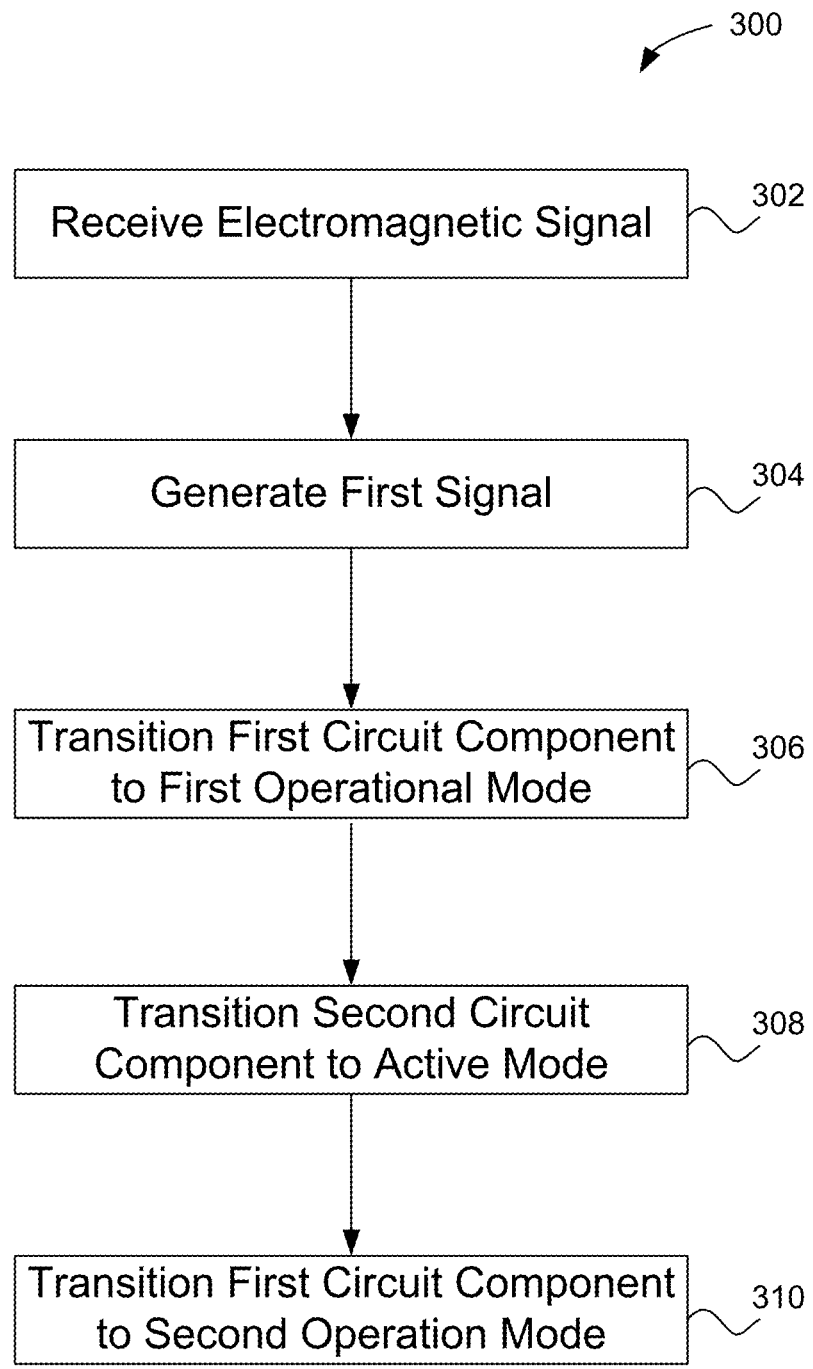
FIG. 9 illustrates a method of using the electronic card of FIG. 8, in accordance with some embodiments.

FIG. 9 illustrates a method 300 of operation the electronic card 2e of FIG. 8, in accordance with some embodiments. At step 302, an electromagnetic signal is received by a first inductor 4 coupled to a body 8 of the electronic card 2e. The electromagnetic signal can be generated by any suitable electromagnetic signal source, such as, for example, a point-of-sale device, a mobile device, a security device, a verification device, and/or any other suitable device configured to generate an electromagnetic signal. The electromagnetic signal can be generated according to one or more standards, such as NFC, BLE, RFID, WiFi, etc.

At step 304, the first inductor 4 generates a first signal configured to activate the second circuit component 16e. In some embodiments, the second circuit component 16e is activated when the voltage of the first signal is equal to or greater than a predetermined value, such as a first threshold voltage. The second circuit component 16e is coupled to and configured to control a first circuit component 12e.

At step 306, the second circuit component 16e transitions the first circuit component 12e to a first operational mode. The second circuit component 16e can be configured to transition the first circuit component 12e to the first operational mode when activated and/or in response to one or more features of a received electromagnetic signal. For example, in some embodiments, the second circuit component 16e transitions the first circuit component 12e to the first operational mode when a signal strength of the electromagnetic signal exceeds a first strength threshold. The first operational mode can include any suitable operational mode, such as, for example, an intermittent, steady-state, and/or predetermined mode of operation. In some embodiments, the first circuit component 12 is a feedback component, such as LED, speaker, piezoelectric component, etc. and is configured to provide a first indicator. The first indicator can provide visual, audible, tactile, and/or other sensory feedback to a user to indicate exposure of the electronic card 2 to the electromagnetic signal having one or more predetermined features. For example, in some embodiments, the first circuit component 12 is an LED and the first operational mode includes intermittent (or blinking) operation of the LED, although it will be appreciated that any suitable feedback element and first indicator can be used.

At step 308, the second circuit component 16 is transitioned to an active mode. The second circuit component 16 is transitioned based on one or more features of the received electromagnetic signal, such as the signal strength, waveform, and/or any other suitable feature. For example, in some embodiments, the second circuit component 16 transitions to an active mode when a signal generated by a first inductor 4 has a voltage greater than or equal to a second threshold voltage. The voltage of the signal is related to the signal strength of the electromagnetic signal. Although specific embodiments are discussed herein, it will be appreciated that the second circuit component 16 can be activated in response to any suitable characteristics of the electromagnetic signal.

In some embodiments, the second circuit component 16e is an integrated circuit configured to receive the electromagnetic signal and generate one or more response signals, although it will be appreciated that the second circuit component 16e can be configured to perform any suitable function(s), such as processing, transmission, storage, retrieval, and/or any other suitable function.

At step 310, the second circuit component 16e transitions the first circuit component 12e to a second operational mode. The first circuit component 12 can be transitioned to the second operational mode in response to one or more features of the received electromagnetic signal and/or in response to one or more functions of the second circuit component 16e. For example, in some embodiments, when the electromagnetic signal has a signal strength greater than or equal to a third strength threshold, the first circuit component 12 is transitioned to the second operational mode. The third strength threshold is equal to or greater than the second strength threshold. As another example, in some embodiments, the second circuit component 16e transitions the first circuit component 12e to the second operational mode after performing one or more predetermined functions. Although specific embodiments are discussed herein, it will be appreciated that the first circuit component 12 can be transitioned in response to any suitable characteristics of the electromagnetic signal.

The second operational mode can include any suitable operational mode, such as, for example, an intermittent, steady-state, and/or predetermined mode of operation. In some embodiments, the first circuit component 12 is a feedback component, such as LED, speaker, piezoelectric component, etc. and is configured to provide a second indicator in a second operational mode. The second indicator can provide visual, audible, tactile, and/or other sensory feedback to a user to indicate exposure of the electronic card 2 to the electromagnetic signal having one or more predetermined features. For example, in some embodiments, the first circuit component 12 is an LED and the second operational mode includes steady-state operation of the LED, although it will be appreciated that any suitable feedback element and second indicator can be used.

Figure 10:
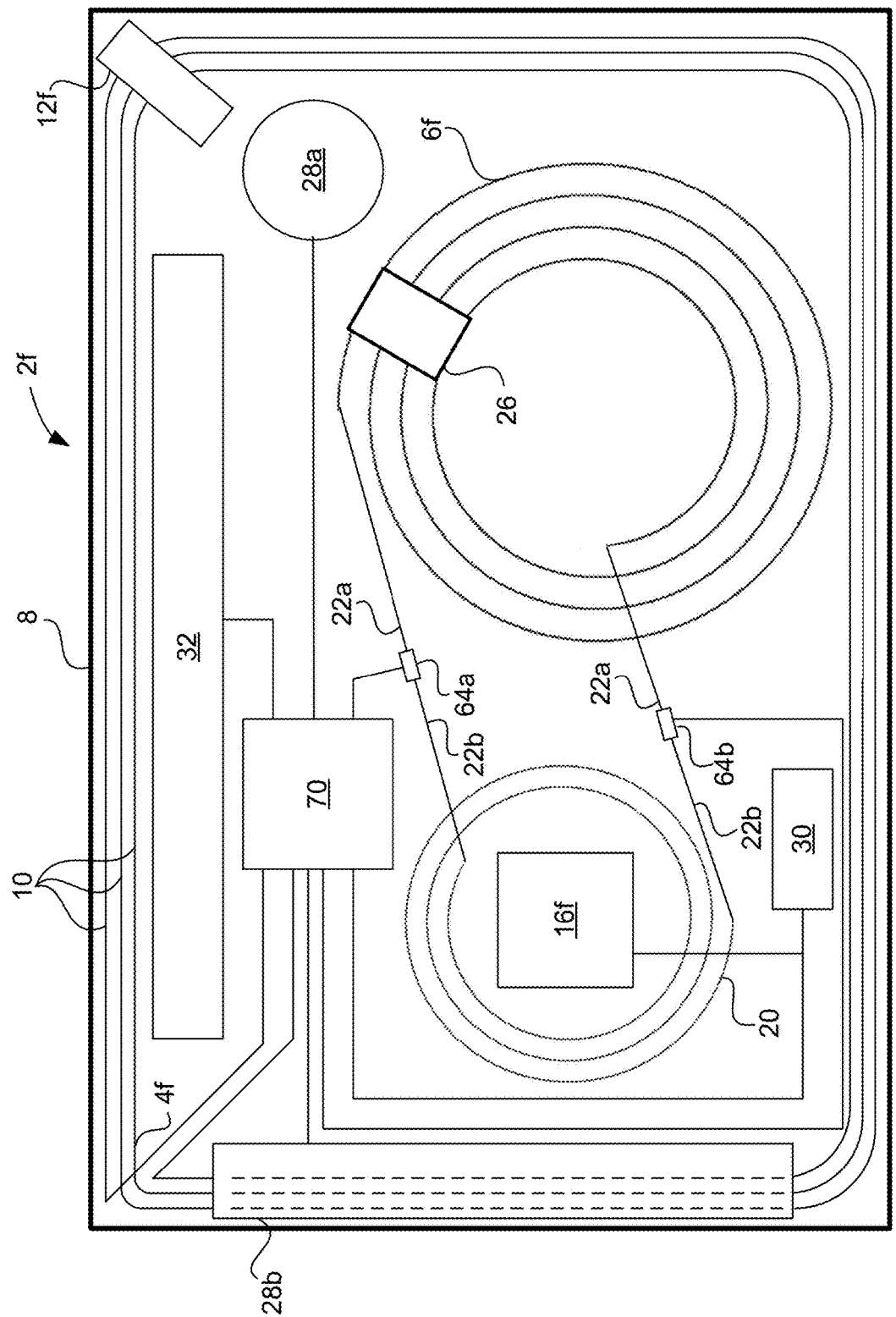
FIG. 10 illustrates an electronic credential card including a plurality of circuit components connected to two or more inductors, in accordance with some embodiments.

FIG. 10 illustrates an electronic card 2f having a plurality of circuit components, in accordance with some embodiments. The electronic card 2f is similar to the electronic card 2 discussed in conjunction with FIG. 1, and similar description is not repeated herein. The electronic card 2f includes a plurality of circuit components each configured to perform one or more functions, such as a first circuit component 12f, a second circuit component 16f, a third circuit component 26, a control circuit 70, one or more input elements 28a, 28b, a storage element 30, a display element 32, and/or any other suitable circuit components. In some embodiments, the electronic card 2f can be configured for one or more functions, including, but not limited to, identification functions, payment functions, authentication functions, verification functions, display functions, storage functions, and/or any other suitable functions.

In some embodiments, the electronic card 2f includes a control circuit 70 configured to control operation of one or more of the plurality of circuit components, for example, to configure the electronic card 2f to perform one or more functions. In the illustrated embodiment, the electronic card 2f is coupled to jumper elements 64a, 64b of the second circuit component 16f, the input element 28, the storage element 30, and the display element 32. The control circuit 70 can be further coupled to the second circuit component 16f (not shown). The control circuit 70 is configured to activate one or more of the plurality of circuit components in response to one or more external stimuli.

For example, in some embodiments, the control circuit 70 controls operation of the jumper elements 64a, 64b in response to an input from the input element 28. The control circuit 70 maintains the jumper elements 64a, 64b in a default open position such that the second inductor 6 is decoupled from the third inductor 20. When an input is received from the input element 28, the control circuit 70 closes the jumper elements 64a, 64b to couple the second inductor 6f to the third inductor 20. By maintaining the jumper elements 64a, 64b in a default open state, the control circuit 70 prevents activation of the second circuit component 16f absent confirmation from a user (i.e., absent an input from the input element 28). The input element 28 can be any suitable input element, such as, for example, a button, a biometric sensor, an OTP circuit, and/or any other suitable input.

In some embodiments, the control circuit 70 is configured to load data from the storage element 30 to configure one or more additional circuit components. For example, in some embodiments, the control circuit 70 can configure one or more of the display 32, the second circuit component 16f, the third circuit component 26, the input elements 28a, 28b, and/or any other suitable circuit component based one or more configuration profiles stored in the storage element 30. For example, in some embodiments, the control circuit 70 is configured to load display data from the storage element 30 for display on the display element 32 in response to data received by the second circuit component 16f. As another example, in some embodiments, the control circuit 70 is configured to generate a one-time passcode for display by the display element 32 in response to signal from the first input element 28a. As yet another example, in some embodiments, the control circuit 70 configures the third circuit component 26 in response to a signal received by the first inductor 4. Although specific examples are provided herein, it will be appreciated that the control circuit 70 can configure any combination of circuit components to perform any combination of tasks in response to one or more signals.

In some embodiments, the electronic card 2f is a multi-function electronic card configured to provide one or more functions, such as logical access control, identification, payment, security, and/or any other suitable functions. For example, in some embodiments, the electronic card 2f can provide identification, authentication, access, and/or other functions in a business environment, including secure access locations (such as factories, hospitals, government facilities, etc.). As another example, in some embodiments, the electronic card 2f can provide data linked to a specific user in a database, such as a student, an employee, a volunteer, etc. The user specific data can include monetary values of accounts, payment to linked accounts (for example, through an NFC or other payment chip), membership information, suggested organizations/membership, maps of related facilities, and/or any other user specific data.

In some embodiments, input elements 28a, 28b include one or more capacitive sensors. For example, in some embodiments, the first input element 28a includes a first capacitive sensor and the second input element 28b includes a second capacitive sensor. The capacitive sensors can include any suitable capacitive sensor, such as a capacitive button, a capacitive pad, a capacitive screen, and/or any other suitable capacitive sensor. In embodiments including multiple input elements 28a, 28b, each of the input elements 28a, 28b can be configured to transition the multi-function electronic card 2f to a predetermined function. For example, in some embodiments the electronic card 2f includes a first input element 28a and a second input element 28b. When a user interacts with the first input element 28a, the control circuit 70 configures the electronic card 2f for a first predetermined function. When a user interacts with the second input element 28b, the control circuit 70 configures the electronic card 2f for a second predetermined function. In some embodiments, if a user interacts with multiple input elements, such as a first input element 28a and a second input element 28b, simultaneously, the control circuit 70 configures the electronic card 2f for a third predetermined function.

Figure 11:
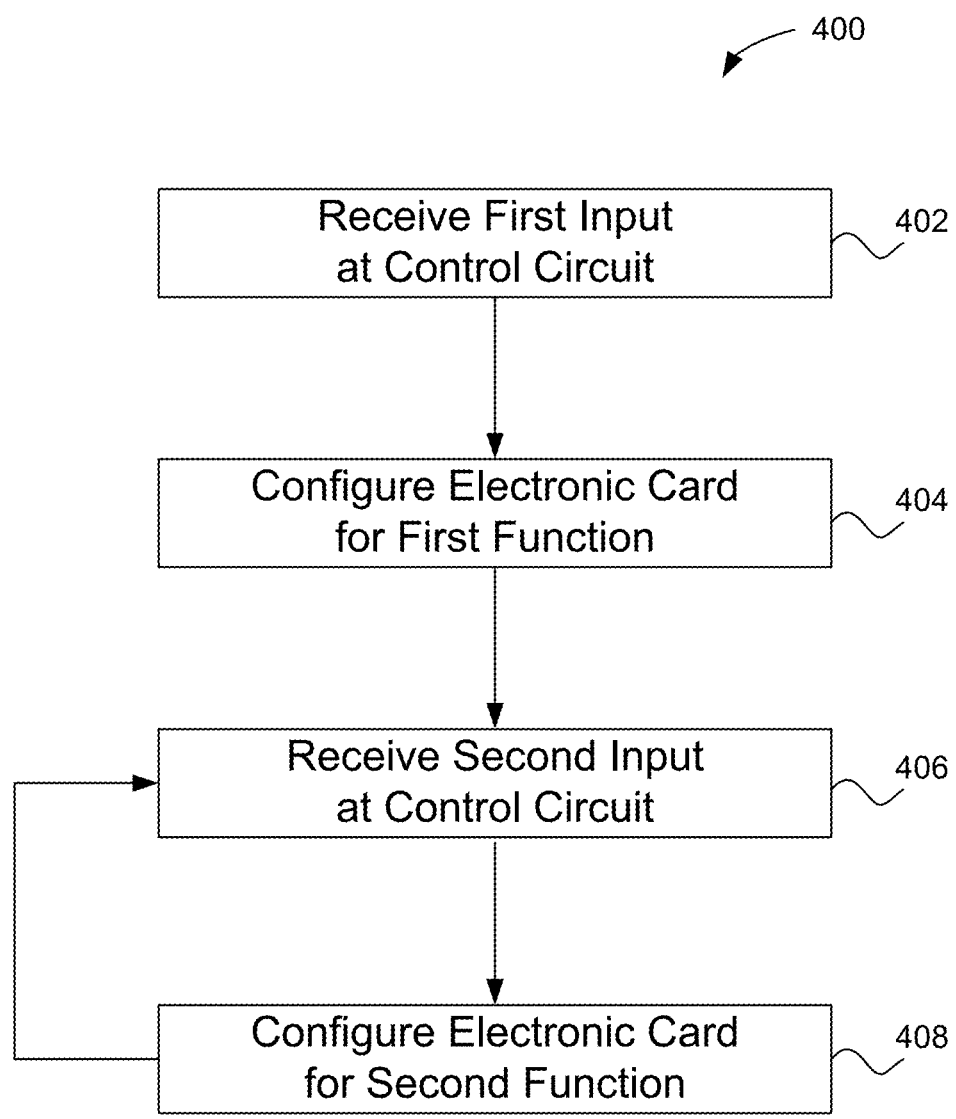
FIG. 11 illustrates a method of using the electronic credential card of FIG. 10, in accordance with some embodiments.

FIG. 11 is a flowchart illustrating a method 400 of operating the electronic card 2f of FIG. 10, in accordance with some embodiments. At step 402, a control circuit 70 receives a first input. For example, in various embodiments, the control circuit 70 can receive a first input from an input element 28a, one or more inductors 4f, 6f, a storage element 30, and/or any other suitable input. In some embodiments, the first input indicates a card configuration, a preferred operation, security verification, and/or any other suitable function of the electronic card 2f.

At step 404, the control circuit 70 configures the electronic card 2f for a first function. In some embodiments, the control circuit 70 is configured to couple and/or decouple one or more circuit components to one or more inductors. For example, in some embodiments, the control circuit 70 is configured to selectively couple a first circuit component to a first inductor 4, a third circuit 26 component to a second inductor 6f, and/or a third inductor 20 to the second inductor 6f. The control circuit 70 can selectively couple the circuit components to the inductors using one or more control elements, such as jumpers 64a, 64b and/or any other suitable control elements. In some embodiments, the control circuit 70 configures the electronic card 2f for wireless communication according to one or more short-range wireless communication standards, such as NFC, WiFi, RFID, BLE, and/or any other suitable standard.

At step 406, the control circuit 70 receives a second input. For example, in various embodiments, the control circuit 70 can receive a second input from one or more inductors 4f, 6f, the second circuit component 16f, a second input element 28b, a storage element 30, and/or any other suitable element. In some embodiments, the second input a card configuration, a preferred operation, security verification, and/or any other suitable function of the electronic card 2f.

At step 408, control circuit 70 configures the electronic card 2f for a second function. In some embodiments, the control circuit 70 is configured to activate one or more circuit components, such as a third circuit component 26 and/or the display element 32. The second function can include transmission of data according to a second short-range wireless communication standard, display of information on the display element 32, storage of data in the storage element 30, and/or any other suitable function.

Although the subject matter has been described in terms of exemplary embodiments, it is not limited thereto. Rather, the appended claims should be construed broadly, to include other variants and embodiments, which may be made by those skilled in the art.

What is claimed is:

1. A device, comprising:
   a first inductor having a first inductive profile;
   a first circuit component coupled to the first inductor;
   a second inductor having a second inductive profile;
   a second circuit component coupled to the second inductor;
   a third inductor;
   a third circuit component inductively coupled to the third inductor;
   a control circuit configured to selectively couple the first inductor and the second inductor to the third inductor; and
   a fourth circuit component, wherein the control circuit is configured to selectively activate the fourth circuit component in response to a signal generated by one of the first inductor or the second inductor.

2. The device of claim 1, wherein the first inductor, the second inductor, the third inductor, or any combination thereof are printed circuit components.

3. The device of claim 1, wherein the control circuit is configured to receive an input and selectively couple one of the first inductor or the second inductor to the third inductor based on the input.

4. A device, comprising:
   a first inductor having a first inductive coupling profile, wherein the first inductor is configured to generate a first voltage when exposed to an electromagnetic signal having a first signal strength, and wherein the first inductor is configured to generate a second voltage when exposed to the electromagnetic signal having a second signal strength, wherein the first signal strength and the second signal strength are different;
   a first circuit component coupled to the first inductor, wherein the first circuit component is operated in a first operational mode in response to the first voltage and in a second operational mode in response to the second voltage;
   a second inductor having a second inductive coupling profile, wherein the second inductor is electrically isolated from the first inductor;
   a second circuit component coupled to the second inductor;
   a third inductor inductively coupled a third circuit component; and
   a control circuit configured to selectively couple the first inductor and the second inductor to the third inductor.

5. The device of claim 4, wherein the first operational mode is an intermittent operational mode and the second operational mode is a steady-state operational mode.

6. The device of claim 5, wherein the second inductor is configured to generate a third voltage when exposed to the electromagnetic signal having the second signal strength, and wherein the second circuit component is transitioned to an on-state in response to the second voltage.

7. The device of claim 5, wherein the second circuit component is configured to generate an electromagnetic response signal in the on-state.

8. The device of claim 4, wherein the first inductor comprises a first plurality of conductive traces and the second inductor comprises a second plurality of conductive traces.

9. The device of claim 8, wherein the first plurality of conductive traces defines a first area, and wherein the second plurality of conductive traces is positioned within the first area.

10. The device of claim 8, wherein the first plurality of conductive traces is disposed about a periphery of a body of the electronic card.

11. The device of claim 4, wherein the first inductor, the second inductor, or both the first inductor and the second inductor are printed circuit components.

12. The device of claim 4, wherein the second circuit component is inductively coupled to the second inductor.

13. The device of claim 12, further comprising a third inductor coupled to the second inductor, wherein the second circuit is inductively coupled to the third inductor.

14. The device of claim 4, wherein the first circuit component is a light-emitting diode and the second circuit component is an integrated circuit.

* * * * *